US009049108B2

(12) United States Patent
Ji

(10) Patent No.: US 9,049,108 B2
(45) Date of Patent: Jun. 2, 2015

(54) WIRELESS NETWORK FAULT DIAGNOSIS METHOD AND DEVICE

(71) Applicant: Huawei Technologies Co., Ltd., Shenzhen (CN)

(72) Inventor: Ping Ji, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/496,571

(22) Filed: Sep. 25, 2014

(65) Prior Publication Data
US 2015/0023148 A1 Jan. 22, 2015

Related U.S. Application Data

(63) Continuation of application No. PCT/CN2013/079754, filed on Jul. 22, 2013.

(51) Int. Cl.
*H04L 12/24* (2006.01)
*H04W 24/04* (2009.01)
*H04W 24/10* (2009.01)

(52) U.S. Cl.
CPC .............. *H04L 41/065* (2013.01); *H04W 24/04* (2013.01); *H04W 24/10* (2013.01)

(58) Field of Classification Search
CPC ..... H04L 41/065; H04W 24/04; H04W 24/10
USPC .......................................... 370/216, 248, 252
See application file for complete search history.

(56) References Cited

U.S. PATENT DOCUMENTS

| 7,200,392 B2* | 4/2007 | Kennedy et al. ............... 455/423 |
| 2008/0188216 A1* | 8/2008 | Kuo et al. ...................... 455/424 |
| 2009/0167520 A1 | 7/2009 | Watanabe et al. |

FOREIGN PATENT DOCUMENTS

| CN | 101448277 A | 6/2009 |
| CN | 101541014 A | 9/2009 |
| CN | 101765137 A | 6/2010 |

OTHER PUBLICATIONS

Partial English Translation and Abstract of Chinese Patent Application No. CN101541014A, Sep. 18, 2014, 4 pages.

(Continued)

*Primary Examiner* — Mohammad Anwar
(74) *Attorney, Agent, or Firm* — Conley Rose, P.C.; Grant Rodolph

(57) ABSTRACT

A wireless network fault diagnosis method and device are provided. The method includes receiving, by a network management server, sampling data of user equipment in at least one area in a wireless network, where the sampling data includes attribute information of the user equipment and probe-collected information of the user equipment; generating, by the network management server according to the sampling data of the user equipment in the at least one area, statistical information that corresponds to each area of the at least one area; and performing, by the network management server, area-based wireless network fault diagnosis according to the statistical information that corresponds to each area of the at least one area. Therefore, area-based wireless network fault diagnosis is performed, a fault trend of the user equipment can be fully perceived, so that corresponding measures are taken against wireless network faults to effectively improve satisfaction on user experience.

30 Claims, 13 Drawing Sheets

(56) References Cited

OTHER PUBLICATIONS

Foreign Communication From A Counterpart Application, PCT Application No. PCT/CN2013/079754, International Search Report dated Apr. 23, 2014, 7 pages.

Foreign Communication From A Counterpart Application, PCT Application No. PCT/CN2013/079754, Written Opinion dated Apr. 23, 2014, 8 pages.

* cited by examiner

WIRELESS NETWORK FAULT DIAGNOSIS METHOD AND DEVICE

CROSS-REFERENCE TO RELATED APPLICATIONS

This application is a continuation of International Application No. PCT/CN2013/079754, filed on Jul. 22, 2013, which is hereby incorporated by reference in its entirety.

TECHNICAL FIELD

Embodiments of the present invention relate to the field of communication technologies, and in particular, to a wireless network fault diagnosis method and device.

BACKGROUND

Because a wireless network involves a wide range including a user equipment side, a wireless network side, and a wired network side, causes of wireless network faults are complex and diverse. For example, a network adapter hardware fault, driver inconsistency, an unauthorized Internet Protocol (IP), a dummy link or serious packet loss, or the like, may occur on the user equipment side; or, signal interference, a signal coverage problem, or a network parameter configuration error, or the like, may occur on the wireless network side; or, a Power Over Ethernet (POE) switch port fault, a wired bearer network fault, or deficient bearer network bandwidth, or the like, may occur on the wired network side. Therefore, high operation and maintenance requirements are imposed on the wireless network, for example, fast locating of a network fault, accurate analysis in fault diagnosis, and timely discovery of a potential network fault.

All wireless network fault analysis technologies in the prior art are "single-point" fault analysis based on a network management system. For example, a network speed is measured for a single User Equipment (UE), or a network access situation of a specific UE is diagnosed using an Authentication, Authorization, Accounting (AAA) server, such as detection of physical connectivity (Link Connectivity) (that is, connectivity from the UE to a gateway), access authentication or Internet Protocol (IP) connectivity. Because the "single-point" fault diagnosis based on the network management system is specific to a single user equipment, and information about a fault that occurs on the user equipment side cannot be acquired, network operation and maintenance staff are unable to fully perceive wireless network faults and unable to predict a fault trend on the side of the user equipment in an area.

SUMMARY

Embodiments of the present invention provide a wireless network fault diagnosis method and device, which can completely diagnose wireless network faults so that corresponding measures are taken against the wireless network faults, thereby effectively improving satisfaction on user experience.

According to a first aspect, a wireless network fault diagnosis method is provided, where the method includes receiving, by a network management server, sampling data of user equipment in at least one area in a wireless network, where the sampling data includes attribute information of the user equipment and corresponding probe-collected information of the user equipment; generating, by the network management server, according to the sampling data of the user equipment in the at least one area, statistical information corresponding to each area of the at least one area; and performing, by the network management server, area-based wireless network fault diagnosis according to the statistical information corresponding to each area of the at least one area.

With reference to the first aspect, in another possible implementation manner, the probe-collected information includes at least one of a fault type of the user equipment, and wireless signal quality information of the user equipment; and the attribute information of the user equipment includes at least one of an identifier of an area in which the user equipment are located, and identifiers of the user equipment.

With reference to the first aspect and any one of the foregoing implementation manners thereof, in another possible implementation manner of the first aspect, the fault type of the user equipment includes a wireless network access fault type of the user equipment, and the generating, by the network management server, according to the sampling data of the user equipment in the at least one area, statistical information corresponding to each area of the at least one area includes collecting, by the network management server, according to the identifier of the area in which the user equipment are located, statistics on sampling data that belongs to a same area and includes the wireless network access fault type of the user equipment from the sampling data of the user equipment in the at least one area, to obtain the number of wireless network access failures of the user equipment or an access failure ratio of the user equipment in a statistics period, where the number of wireless network access failures of the user equipment or the access failure ratio of the user equipment is corresponding to each area of the at least one area; and outputting statistical information about the number of the wireless network access failures or the access failure ratio that falls within a first threshold rank in the statistics period, where the number of the wireless network access failures or the access failure ratio is corresponding to each area of the at least one area.

With reference to the first aspect and any one of the foregoing implementation manners thereof, in another possible implementation manner, the generating, by the network management server, according to the sampling data of the user equipment in the at least one area, statistical information corresponding to each area of the at least one area includes collecting, by the network management server according to the identifier of the area in which the user equipment are located, statistics on sampling data that belongs to a same area and includes the wireless signal quality information of the user equipment from the sampling data of the user equipment in the at least one area, to obtain a signal value of wireless signal quality of the user equipment in a statistics period, where the signal value is corresponding to each area of the at least one area; and outputting statistical information about the signal value that falls within a second threshold rank in the statistics period, where the signal value is corresponding to each area of the at least one area.

With reference to the first aspect and any one of the foregoing implementation manners thereof, in another possible implementation manner, the generating, by the network management server, according to the collected sampling data, statistical information corresponding to each area of the at least one area includes collecting, by the network management server according to the identifier of the area in which the user equipment are located, statistics on sampling data that belongs to a same area and includes the fault type of the user equipment from the sampling data of the user equipment in the at least one area, to obtain first statistical information that includes the number of users or a percentage of users who encounter the fault type in each area of the at least one area in a statistics period; or, collecting, by the network management server according to the identifier of the area in which the user equipment are located, statistics on sampling data that belongs to a same area and includes the wireless signal quality information of the user equipment from the sampling data of the user equipment in the at least one area, to obtain second statistical information that includes the number of users or a percentage of users whose signal value of wireless signal quality is smaller than a first signal threshold in each area of the at least one area in the statistics period.

With reference to the first aspect and any one of the foregoing implementation manners thereof, in another possible implementation manner, the performing, by the network management server, area-based wireless network fault diagnosis according to the statistical information corresponding to each area of the at least one area includes when the network management server determines, according to the first statistical information, that a percentage of user equipment encountering the fault type in a first area of the at least one area is higher than a first percentage threshold, determining that a manner of the area-based wireless network fault diagnosis is detecting connectivity of a network connection of the first area; if the network connection of the first area fails, outputting, by the network management server, a wireless network fault diagnosis result that indicates a fault of the network connection; and if the network connection of the first area is normal, further determining, by the network management server, that the manner of the area-based wireless network fault diagnosis is detecting whether a service is problematic.

With reference to the first aspect and any one of the foregoing implementation manners thereof, in another possible implementation manner of the first aspect, the performing, by the network management server, area-based wireless network fault diagnosis according to the statistical information corresponding to each area of the at least one area includes when the network management server determines, according to the second statistical information, that a percentage of user equipment whose signal value of wireless signal quality is smaller than the first signal threshold in a first area of the at least one area is higher than a second percentage threshold, determining that the manner of the area-based wireless network fault diagnosis is detecting whether a service is problematic.

With reference to the first aspect and any one of the foregoing implementation manners thereof, in another possible implementation manner of the first aspect, the determining, by the network management server, that the manner of the area-based wireless network fault diagnosis is detecting whether a service is problematic includes determining, by the network management server, that the manner of the area-based wireless network fault diagnosis is at least one of detecting the maximum number of users who access the service, detecting a user association failure ratio of the service, and detecting traffic of the user equipment whose traffic falls within a third threshold rank among user equipment that use the service or detecting a radio frequency bandwidth utilization ratio of the service.

With reference to the first aspect and any one of the foregoing implementation manners thereof, in another possible implementation manner of the first aspect, the receiving, by a network management server, sampling data of user equipment in at least one area in the wireless network includes receiving, by the network management server, sampling data of the user equipment in the at least one area in the wireless network, where the sampling data is sent by a collection server; or collecting, by the network management server, sampling data of the user equipment in the at least one area in the wireless network.

With reference to the first aspect and any one of the foregoing implementation manners thereof, in another possible implementation manner of the first aspect, the fault type of the user equipment includes an environment configuration fault type of the user equipment or the wireless network access fault type of the user equipment; or the wireless signal quality information of the user equipment includes delay information, packet loss information, or wireless signal stability information.

According to a second aspect, a wireless network fault diagnosis method is provided, where the method includes recording, by a user equipment, probe-collected information of the user equipment; and sending, by the user equipment, sampling data to a network management server or a collection server, where the sampling data includes attribute information of the user equipment and the probe-collected information of the user equipment, so that the network management server generates, according to received sampling data of user equipment in the at least one area in a wireless network, statistical information corresponding to each area in at least one area, and performs area-based wireless network fault diagnosis according to the statistical information corresponding to each area of the at least one area.

With reference to the second aspect, in another possible implementation manner, before the sending, by the user equipment, sampling data to a network management server or a collection server, the method further includes receiving, by the user equipment from an authentication server, an address of the network management server or an address of the collection server; and the sending, by the user equipment, sampling data to a network management server or a collection server includes sending, by the user equipment, the sampling data to the network management server according to the address of the network management server; or sending, by the user equipment, the sampling data to the collection server according to the address of the collection server.

With reference to the second aspect and any one of the foregoing implementation manners thereof, in another possible implementation manner of the second aspect, the receiving, by the user equipment from an authentication server, an address of the network management server or an address of the collection server includes receiving, by the user equipment, an Extensible Authentication Protocol (EAP) packet sent by the authentication server, where the address of the network management server or the address of the collection server is carried in the EAP packet.

With reference to the second aspect and any one of the foregoing implementation manners thereof, in another possible implementation manner of the second aspect, the probe-collected information includes at least one of a fault type of the user equipment, and wireless signal information of the user equipment; and the attribute information of the user equipment includes at least one of: an identifier of an area in which the user equipment is located, and an identifier of the user equipment.

With reference to the second aspect and any one of the foregoing implementation manners thereof, in another possible implementation manner of the second aspect, the fault type of the user equipment includes an environment configuration fault type of the user equipment or the wireless network access fault type of the user equipment; or the wireless signal quality information of the user equipment includes delay information, packet loss information, or wireless signal stability information.

According to a third aspect, a wireless network fault diagnosis method is provided, where the method includes collecting, by a collection server, sampling data sent by user equipment in at least one area in a wireless network, where the sampling data includes attribute information of the user equipment and corresponding probe-collected information of the user equipment; and sending, by the collection server, the sampling data of the user equipment in the at least one area to a network management server, so that the network management server generates, according to the sampling data of the user equipment in the at least one area, statistical information corresponding to each area of the at least one area, and performs area-based wireless network fault diagnosis according to the statistical information corresponding to each area of the at least one area.

With reference to the third aspect, in another possible implementation manner, the probe-collected information includes at least one of a fault type of the user equipment, and wireless signal quality information of the user equipment; and the attribute information of the user equipment includes at least one of an identifier of an area in which the user equipment are located, and identifiers of the user equipment.

With reference to the third aspect and any one of the foregoing implementation manners thereof, in another possible implementation manner of the third aspect, the fault type of the user equipment includes an environment configuration fault type of the user equipment or the wireless network access fault type of the user equipment; or the wireless signal quality information of the user equipment includes delay information, packet loss information, or wireless signal stability information.

According to a fourth aspect, a wireless network fault diagnosis method is provided, where the method includes obtaining, by an authentication server, a preconfigured address of a network management server or a preconfigured address of a collection server; and sending, by the authentication server, the address of the network management server or the address of the collection server to a user equipment, so that the user equipment sends sampling data to the network management server according to the address of the network management server or sends sampling data to the collection server according to the address of the collection server, where the sampling data includes attribute information of the user equipment and probe-collected information of the user equipment.

With reference to the fourth aspect, in another possible implementation manner, the sending the address of the network management server or the address of the collection server to a user equipment includes sending an EAP packet to the user equipment, where the address of the network management server or the address of the collection server is carried in the EAP packet.

According to a fifth aspect, a network management server is provided, where the network management server includes a receiving unit configured to receive sampling data of user equipment in at least one area in a wireless network, where the sampling data includes attribute information of the user equipment and corresponding probe-collected information of the user equipment; a generating unit configured to generate, according to the sampling data of the user equipment in the at least one area, statistical information corresponding to each area of the at least one area and is received by the receiving unit; and a diagnosing unit configured to perform area-based wireless network fault diagnosis according to the statistical information corresponding to each area of the at least one area and is generated by the generating unit.

With reference to the fifth aspect, in another possible implementation manner, the probe-collected information received by the receiving unit includes at least one of a fault type of the user equipment, and wireless signal information of the user equipment; and the attribute information of the user equipment that is received by the receiving unit includes at least one of an identifier of an area in which the user equipment are located, and identifiers of the user equipment.

With reference to the fifth aspect and any one of the foregoing implementation manners thereof, in another possible implementation manner of the fifth aspect, the fault type of the user equipment that is received by the receiving unit includes a wireless network access fault type of the user equipment; and the generating unit is configured to collect, according to the identifier of the area in which the user equipment are located, statistics on sampling data that belongs to a same area and includes the wireless network access fault type of the user equipment from the sampling data that is of the user equipment in the at least one area and is received by the receiving unit, to obtain the number of wireless network access failures or an access failure ratio of the user equipment in a statistics period, where the number of wireless network access failures or the access failure ratio is corresponding to each area of the at least one area; and output statistical information about the number of access failures or the access failure ratio that falls within a first threshold rank in the statistics period, where the number of access failures or the access failure ratio is corresponding to each area of the at least one area.

With reference to the fifth aspect and any one of the foregoing implementation manners thereof, in another possible implementation manner of the fifth aspect, the generating unit is configured to collect, according to the identifier of the area in which the user equipment are located, statistics on sampling data that belongs to a same area and includes the wireless signal quality information of the user equipment from the sampling data that is of the user equipment in the at least one area and is received by the receiving unit, to obtain a signal value of wireless signal quality of the user equipment in a statistics period, where the signal value is corresponding to each area of the at least one area; and output statistical information about the signal value that falls within a second threshold rank in the statistics period, where the signal value is corresponding to each area of the at least one area.

With reference to the fifth aspect and any one of the foregoing implementation manners thereof, in another possible implementation manner of the fifth aspect, the generating unit is configured to collect, according to the identifier of the area in which the user equipment are located, statistics on sampling data that belongs to a same area and includes the fault type of the user equipment from the sampling data received by the receiving unit, to obtain first statistical information that includes the number of users or a percentage of users who encounter the fault type in each area of the at least one area in a statistics period; or the generating unit is configured to collect, according to the identifier of the area in which the user equipment are located, statistics on sampling data that belongs to a same area and includes the wireless signal quality information of the user equipment from the sampling data received by the receiving unit, to obtain second statistical information that includes the number of users or a percentage of users whose signal value of wireless signal quality is smaller than a first signal threshold in each area of the at least one area in the statistics period.

With reference to the fifth aspect and any one of the foregoing implementation manners thereof, in another possible implementation manner of the fifth aspect, the diagnosing unit is configured to, when it is determined according to the first statistical information that a percentage of user equipment encountering the fault type in a first area of the at least one area is higher than a first percentage threshold, determine that a manner of the area-based wireless network fault diagnosis is detecting connectivity of a network connection of the first area; and the network management server further includes an outputting unit, where the outputting unit is configured to, if the diagnosing unit diagnoses that the network connection of the first area fails, output a wireless network fault diagnosis result that indicates a fault of the network connection; and the diagnosing unit is further configured to, if the diagnosing unit diagnoses that the network connection of the first area is normal, further determine that the manner of the area-based wireless network fault diagnosis is detecting whether a service is problematic.

With reference to the fifth aspect and any one of the foregoing implementation manners thereof, in another possible implementation manner of the fifth aspect, the diagnosing unit is configured to, when it is determined according to the second statistical information that a percentage of user equipment whose signal value of wireless signal quality is smaller than the first signal threshold in a first area of the at least one area is higher than a second percentage threshold, determine that the manner of the area-based wireless network fault diagnosis is detecting whether a service is problematic.

With reference to the fifth aspect and any one of the foregoing implementation manners thereof, in another possible implementation manner of the fifth aspect, in determining that the manner of the area-based wireless network fault diagnosis is detecting whether a service is problematic, the diagnosing unit is configured to determine that the manner of the area-based wireless network fault diagnosis is at least one of detecting the maximum number of users who access the service, detecting a user association failure ratio of the service, and detecting traffic of the user equipment whose traffic falls within a third threshold rank among user equipment that use the service or a radio frequency bandwidth utilization ratio of the service.

With reference to the fifth aspect and any one of the foregoing implementation manners thereof, in another possible implementation manner of the fifth aspect, the receiving unit is configured to receive sampling data of the user equipment in the at least one area in the wireless network, where the sampling data is sent by a collection server; or the receiving unit is configured to collect sampling data sent by the user equipment in the at least one area in the wireless network.

With reference to the fifth aspect and any one of the foregoing implementation manners thereof, in another possible implementation manner of the fifth aspect, the fault type of the user equipment that is received by the receiving unit includes an environment configuration fault type of the user equipment or the wireless network access fault type of the user equipment; or the wireless signal quality information of the user equipment that is received by the receiving unit includes delay information, packet loss information, or wireless signal stability information.

According to a sixth aspect, a user equipment is provided, where the user equipment includes a recording unit configured to record probe-collected information of the user equipment; and a sending unit configured to send sampling data to a network management server or a collection server, where the sampling data includes attribute information of the user equipment and the probe-collected information, which is recorded by the recording unit, of the user equipment, so that the network management server generates, according to received sampling data of user equipment in at least one area in a wireless network, statistical information corresponding to each area in at least one area, and performs area-based wireless network fault diagnosis according to the statistical information corresponding to each area of the at least one area.

With reference to the sixth aspect, in another possible implementation manner, the user equipment further includes a receiving unit, where the receiving unit is configured to receive, from an authentication sever, an address of the network management server that is sent by an authentication server or an address of the collection server; and the sending unit is configured to send the sampling data to the network management server according to the address of the network management server that is received by the receiving unit, so that the network management server generates, according to the received sampling data of the user equipment in the at least one area in the wireless network, statistical information corresponding to each area of the at least one area, and performs area-based wireless network fault diagnosis according to the statistical information corresponding to each area of the at least one area; or, send the sampling data to the collection server according to the address of the collection server that is received by the receiving unit, and further, using the collection server, send the sampling data to the network management server, so that the network management server generates, according to the sampling data of the user equipment in the at least one area, statistical information corresponding to each area of the at least one area, and performs area-based wireless network fault diagnosis according to the statistical information corresponding to each area of the at least one area.

With reference to the sixth aspect and any one of the foregoing implementation manners thereof, in another possible implementation manner of the sixth aspect, the receiving unit is configured to receive an EAP packet sent by the authentication server, where the EAP packet carries the address of the network management server or the address of the collection server.

With reference to the sixth aspect and any one of the foregoing implementation manners thereof, in another possible implementation manner of the sixth aspect, the probe-collected information sent by the sending unit includes at least one of a fault type of the user equipment, and wireless signal information of the user equipment; and the attribute information of the user equipment that is sent by the sending unit includes at least one of an identifier of an area in which the user equipment is located, and an identifier of the user equipment.

With reference to the sixth aspect and any one of the foregoing implementation manners thereof, in another possible implementation manner of the sixth aspect, the fault type of the user equipment that is recorded by the recording unit includes an environment configuration fault type of the user equipment or the wireless network access fault type of the user equipment; or the wireless signal quality information of the user equipment that is recorded by the recording unit includes delay information, packet loss information, or wireless signal stability information.

According to a seventh aspect, a collection server is provided, where the collection server includes a collecting unit configured to collect sampling data sent by user equipment in at least one area in a wireless network, where the sampling data collected by the collecting unit includes attribute information of the user equipment and corresponding probe-collected information of the user equipment; and a sending unit configured to send the sampling data collected by the collecting unit to a network management server, so that the network management server generates, according to the sampling data of the user equipment in the at least one area, statistical information corresponding to each area of the at least one area, and performs area-based wireless network fault diagnosis according to the statistical information corresponding to each area of the at least one area.

With reference to the seventh aspect, in another possible implementation manner, the probe-collected information collected by the collecting unit includes at least one of a fault type of the user equipment, and wireless signal quality information of the user equipment; and the attribute information of the user equipment that is collected by the collecting unit includes at least one of an identifier of an area in which the user equipment are located, and identifiers of the user equipment.

With reference to the seventh aspect and any one of the foregoing implementation manners thereof, in another possible implementation manner of the seventh aspect, the fault type of the user equipment that is collected by the collecting unit includes an environment configuration fault type of the user equipment or the wireless network access fault type of the user equipment; or the wireless signal quality information of the user equipment that is collected by the collecting unit includes delay information, packet loss information, or wireless signal stability information.

According to an eighth aspect, an authentication server is provided, where the authentication server includes an obtaining unit configured to obtain a preconfigured address of a network management server or a preconfigured address of a collection server; and a sending unit configured to send, to a user equipment, the address of the network management server that is obtained by the obtaining unit or the address of the collection server that is obtained by the obtaining unit, so that the user equipment sends sampling data to the network management server according to the address of the network management server or sends sampling data to the collection server according to the address of the collection server, where the sampling data includes attribute information of the user equipment and probe-collected information of the user equipment.

With reference to the eighth aspect, in another possible implementation manner, the sending unit is configured to send an EAP packet to the user equipment, where the EAP packet carries the address of the network management server or the address of the collection server, so that the user equipment sends the sampling data to the network management server according to the address of the network management server or sends the sampling data to the collection server according to the address of the collection server, where the sampling data includes the attribute information of the user equipment and the probe-collected information of the user equipment.

According to a ninth aspect, a communications system is provided, where the communications system includes a user equipment, an authentication server, a network management server, and a collection server, where the authentication server is configured to send an address of the collection server to the user equipment; the user equipment is configured to record probe-collected information of the user equipment, receive the address of the collection server that is sent by the authentication server, and send sampling data to the collection server according to the address of the collection server, where the sampling data includes attribute information of the user equipment and the probe-collected information of the user equipment; the collection server is configured to receive and collect sampling data sent by user equipment in at least one area in a wireless network, and send the collected sampling data to the network management server; and the network management server is configured to receive the sampling data, which is collected by the collection server, of the user equipment in the at least one area, generate, according to the sampling data of the user equipment in the at least one area, statistical information corresponding to each area of the at least one area, and perform area-based wireless network fault diagnosis according to the statistical information corresponding to each area of the at least one area.

According to a tenth aspect, a communications system is provided, where the communications system includes a user equipment, an authentication server, and a network management server, where the authentication server is configured to send an address of the network management server to the user equipment; the user equipment is configured to record probe-collected information of the user equipment, and send sampling data to the network management server, where the sampling data includes attribute information of the user equipment and the probe-collected information of the user equipment; and the network management server is configured to receive and collect sampling data sent by user equipment in at least one area in a wireless network, generate, according to the sampling data of the user equipment in the at least one area, statistical information corresponding to each area of the at least one area, and perform area-based wireless network fault diagnosis according to the statistical information corresponding to each area of the at least one area.

In the embodiments of the present invention, a network management server receives sampling data of user equipment in at least one area in a wireless network, where the sampling data includes attribute information of the user equipment and corresponding probe-collected information of the user equipment; the network management server generates, according to the sampling data, statistical information corresponding to each area of the at least one area; and the network management server performs area-based wireless network fault diagnosis according to the statistical information corresponding to each area of the at least one area. Therefore, using the collected sampling data of the user equipment in the at least one area in the wireless network, the statistical information corresponding to each area of the at least one area is generated to perform wireless network fault diagnosis, and a fault trend on the side of the user equipment can be fully perceived, so that corresponding measures are taken against wireless network faults to effectively improve satisfaction on user experience.

BRIEF DESCRIPTION OF DRAWINGS

To describe the technical solutions in the embodiments of the present invention more clearly, the following briefly introduces accompanying drawings required for describing the embodiments or the prior art. The accompanying drawings in the following description show merely some embodiments of the present invention, and a person of ordinary skill in the art may still derive other drawings according to these accompanying drawings without creative efforts.

DESCRIPTION OF EMBODIMENTS

The following clearly describes the technical solutions in the embodiments of the present invention with reference to the accompanying drawings in the embodiments of the present invention. The embodiments to be described are a part rather than all of the embodiments of the present invention. All other embodiments obtained by a person of ordinary skill in the art based on the embodiments of the present invention without creative efforts shall fall within the protection scope of the present invention.

It should be understood that technical solutions of the embodiments of the present invention are applicable to various communications systems, for example, a Global System for Mobile Communications (GSM) system, a Code Division Multiple Access (CDMA) system, a Wideband Code Division Multiple Access (WCDMA) system, a General Packet Radio Service (GPRS) system, a Long-Term Evolution (LTE) system, an LTE Frequency Division Duplex (FDD) system, an LTE Time Division Duplex (TDD) system, a Universal Mobile Telecommunications System (UMTS), a Wireless Local Area Network (WLAN), and a Worldwide Interoperability for Microwave Access (WiMAX) communications system.

In the embodiments of the present invention, a UE may be referred to as a terminal, a Mobile Station (MS), a mobile terminal, and the like. The user equipment may communicate with one or more core networks using a Radio Access Network (RAN). For example, the user equipment may be a mobile phone (also referred to as a "cellular" phone), a computer with a mobile terminal, and the like, and may also be a desktop computer. The user equipment may also be a mobile apparatus that is portable, pocket-sized, handheld, embedded into a computer, or mounted on a vehicle, which exchanges voice and/or data with a radio access network.

To help a person skilled in the art understand the embodiments of the present invention, the communications system is described using a WLAN network as an example. For example, several user equipment are interconnected using an Access Point (AP) (access point) to share resources, which is applied in scenarios such as a residential area or an enterprise office. It should be understood that the embodiments of the present invention are not limited thereto, and the communications system may be another communications system except the WLAN network.

Figure 1:
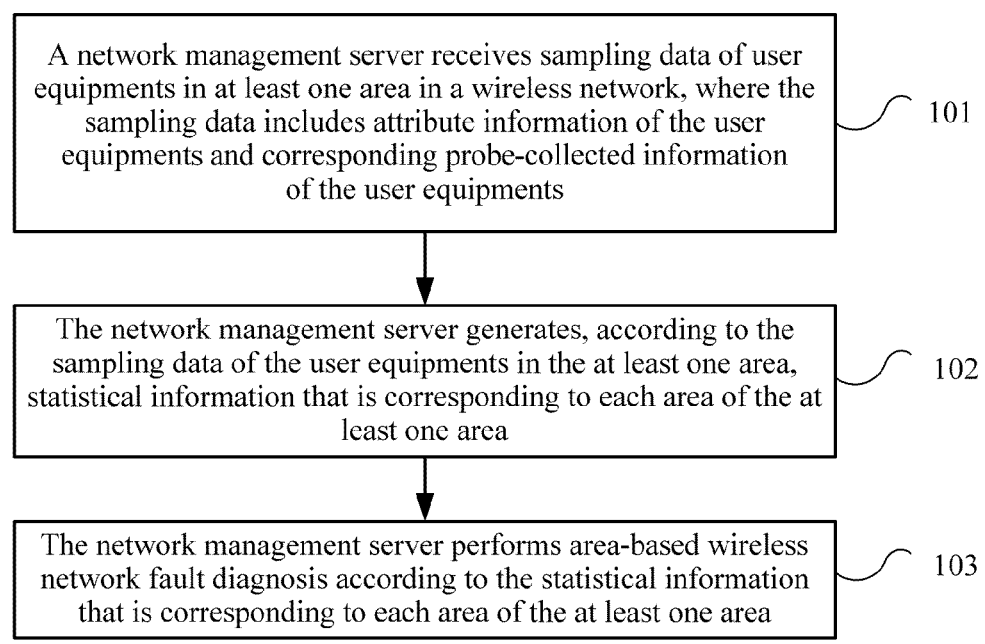
FIG. 1 is a flowchart of a wireless network fault diagnosis method according to an embodiment of the present invention.

FIG. 1 is a flowchart of a wireless network fault diagnosis method according to an embodiment of the present invention. The method shown in FIG. 1 is implemented by a network management server.

101. A network management server receives sampling data of user equipment in at least one area in a wireless network, where the sampling data includes attribute information of the user equipment and corresponding probe-collected information of the user equipment.

102. The network management server generates, according to the sampling data, statistical information corresponding to each area of the at least one area of the user equipment in the at least one area.

103. The network management server performs area-based wireless network fault diagnosis according to the statistical information corresponding to each area of the at least one area.

Optionally, in an implementation manner, the attribute information of a specific user equipment included in the sampling data that is sent by the user equipment and collected by the network management server may include at least one of an identifier of an area in which the user equipment is located (for example, an identifier of an AP that covers the user equipment and/or an identifier of a building in which the user equipment is located), an identifier of the user equipment (for example, a media access control (MAC) address or a user name of the user equipment), and the like. Optionally, the sampling data may further include fault detection time of the user equipment. The probe-collected information included in the sampling data that is sent by a specific user equipment and collected by the network management server includes at least one of a fault type of the user equipment, and wireless signal quality information of the user equipment. It should be understood that the embodiment of the present invention sets no limitation thereto.

Further, the fault type of the user equipment may be an environment configuration fault type of the user equipment or a wireless network access fault type of the user equipment. Optionally, the environment configuration fault type of the user equipment may be that a configuration of an operating system patch, a network adapter driver, an IP obtaining manner, a network adapter power saving mode, or the like, is incorrect; and the wireless network access fault type may be that a service such as a Dynamic Host Configuration Protocol (DHCP) service or a Domain Name System (DNS) service is disabled, or that a network connection of a gateway or the DNS or the like fails. The wireless signal quality information of the user equipment may be delay information, packet loss information, wireless signal stability information (for example, signal strength, a jitter, a signal-to-noise ratio or interference strength), or the like. It should be understood that the embodiment of the present invention sets no limitation thereto.

In the embodiment of the present invention, a network management server receives sampling data of user equipment in at least one area in a wireless network, where the sampling data includes attribute information of the user equipment and corresponding probe-collected information of the user equipment; the network management server generates statistical information about an area according to the sampling data; and the network management server performs area-based wireless network fault diagnosis according to the statistical information about the area. Therefore, using the collected sampling data of the user equipment in the at least one area in the wireless network, the statistical information corresponding to each area of the at least one area is generated to perform wireless network fault diagnosis, and a fault trend on the side of the user equipment can be fully perceived, so that corresponding measures are taken against wireless network faults to effectively improve satisfaction on user experience.

It should be pointed out that the area is a concept of a geographic area. The same area may be a same floor of a building, a same building, a same campus, a same city, or the like. Certainly, the user equipment under a same AP or access controller (AC) may also be sorted into the same area. It should be understood that the embodiment of the present invention sets no limitation thereto.

It should further be noted that a device for collecting sampling data may be an independent collection server, and the collection server forwards the collected sampling data to the network management server. A functional unit (collection server) for collecting the sampling data may also be integrated into the network management server. It should be understood that the embodiment of the present invention sets no limitation thereto. Further, when the device for collecting sampling data is an independent collection server, the collection server collects sampling data sent by user equipment in at least one area in a wireless network, and in step 101, the network management server receives the sampling data of the user equipment in the at least one area in the wireless network, where the sampling data is sent by the collection server. When the collection server is deployed in the network management server, in step 101, the network management server receives and collects the sampling data of the user equipment in the at least one area in the wireless network, and further, the network management server may receive the sampling data that is sent by the user equipment in the at least one area in the wireless network by means of User Data Protocol (UDP).

Optionally, in a possible implementation manner, step 102 may include step 202 shown in FIG. 2, or step 302 shown in FIG. 3, or step 402 shown in FIG. 4, as described below.

Figure 2:
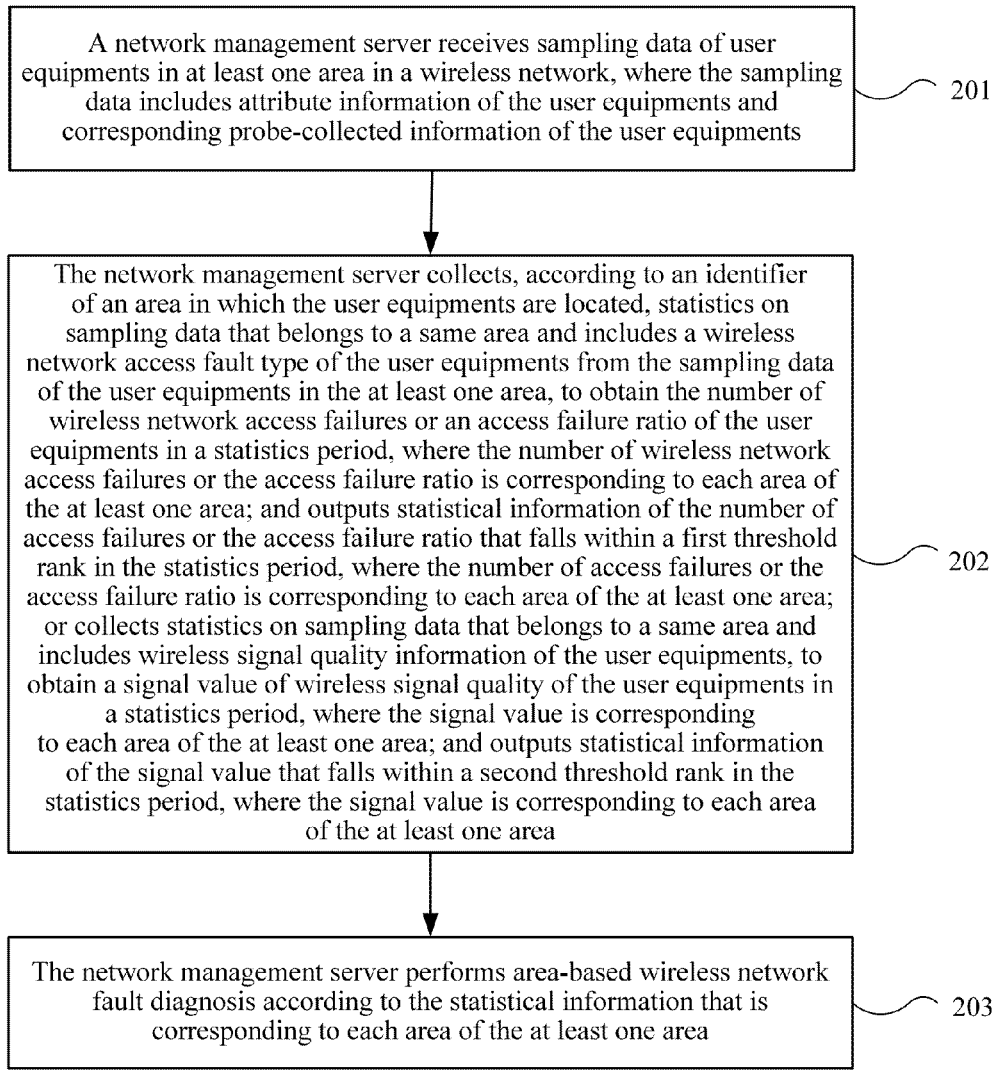
FIG. 2 is a flowchart of a wireless network fault diagnosis method according to another embodiment of the present invention.

Step 202 shown in FIG. 2: The network management server collects, according to the identifier of the area in which the user equipment are located, statistics on sampling data that belongs to a same area and includes the wireless network access fault type of the user equipment from the sampling data of the user equipment in the at least one area, to obtain the number of wireless network access failures or an access failure ratio of the user equipment in a statistics period, where the number of wireless network access failures or the access failure ratio is corresponding to each area of the at least one area; and outputs statistical information (for example, a fault trend report of TOP-N1 users of access failure ratios, and it should be understood that the report is an expression form of the statistical information, which is not limited by the present invention) about the number of access failures or the access failure ratio that falls within a first threshold rank (TOP-N1, where N1 is a positive integer, for example, TOP10) in the statistics period, where the number of access failures or the access failure ratio is corresponding to each area of the at least one area. Optionally, the network management server collects, according to the identifier of the area in which the user equipment are located, statistics on sampling data that belongs to a same area and includes the wireless signal quality information of the user equipment from the sampling data of the user equipment in the at least one area, to obtain a signal value (for example, a signal strength value or a signal-to-noise ratio, or a signal value denoted by interference strength or delay or the like) of wireless signal quality of the user equipment in a statistics period, where the signal value is corresponding to each area of the at least one area; and outputs statistical information (for example, an access quality trend report of TOP-N2 users of low access quality) about the signal value that falls within a second threshold rank (TOP-N2, where N2 is a positive integer) in the statistics period, where the signal value is corresponding to each area of the at least one area. For description of step 201, reference may be made to step 101; and, for description of step 203, reference may be made to step 103, and details are not described herein again.

Figure 3:
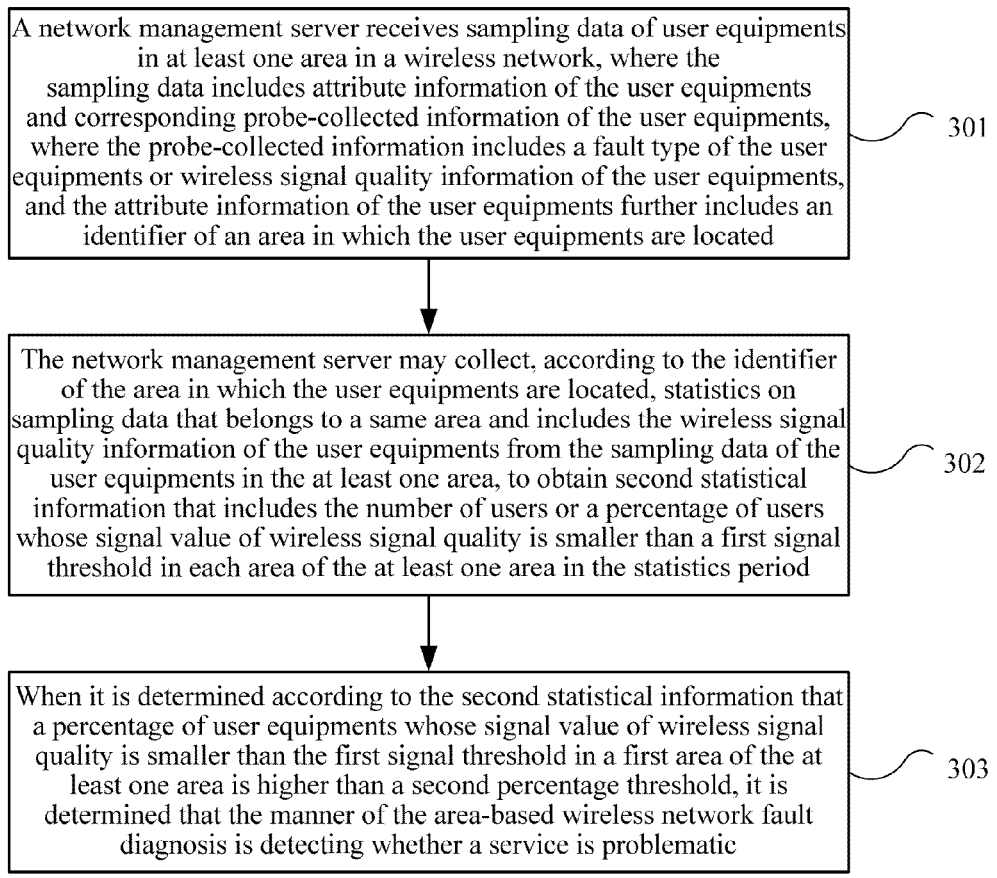
FIG. 3 is a flowchart of a wireless network fault diagnosis method according to another embodiment of the present invention.

Optionally, step 302 shown in FIG. 3: The network management server may collect, according to the identifier of the area in which the user equipment are located, statistics on sampling data that belongs to a same area and includes the wireless signal quality information of the user equipment from the sampling data of the user equipment in the at least one area, to obtain second statistical information (for example, a report of low signal quality areas) that includes the number of users or a percentage of users whose signal value of wireless signal quality (here a larger signal value represents higher signal quality, and the signal value may be denoted by a signal strength value or a signal-to-noise ratio or interference strength or delay or another parameter) is smaller than a first signal threshold in each area of the at least one area in the statistics period. It should be understood that, in this specification, the second statistical information is used to indicate statistical information about the area-based wireless signal quality. For description of step 301, reference may be made to step 101; and, for description of step 303, reference may be made to step 103, and details are not described herein again.

Figure 4:
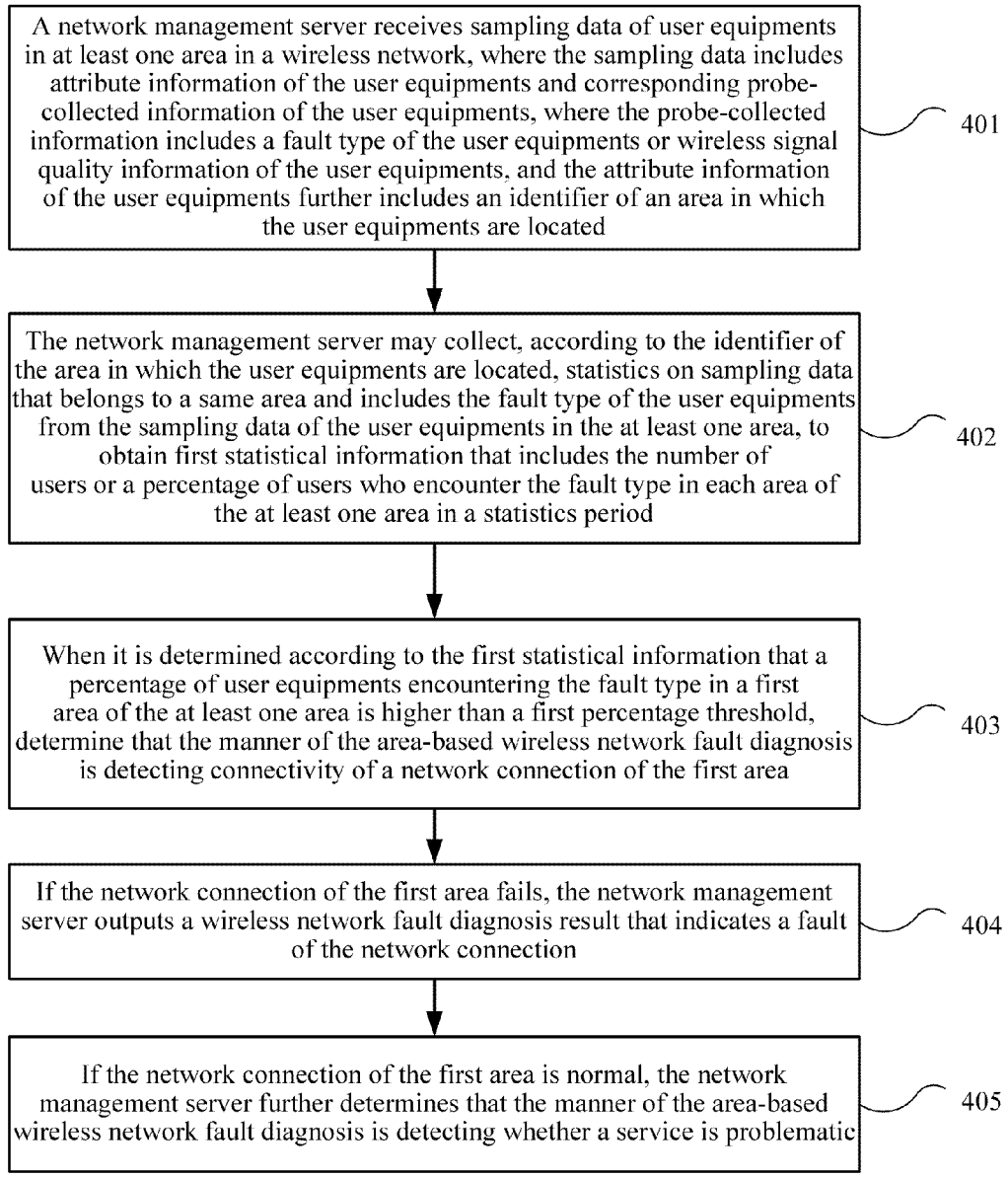
FIG. 4 is a flowchart of a wireless network fault diagnosis method according to another embodiment of the present invention.

Optionally, step 402 shown in FIG. 4: The network management server may collect, according to the identifier of the area in which the user equipment are located, statistics on sampling data that belongs to a same area and includes the fault type of the user equipment from the sampling data of the user equipment in the at least one area, to obtain first statistical information (for example, statistical information about TOP-N areas of high fault ratios, where N is a positive integer, and the statistical information may be represented by a report) that includes the number of users or a percentage of users who encounter the fault type in each area of the at least one area in the statistics period, and the like. It should be understood that, in this specification, the first statistical information is used to indicate area-based statistical information about the fault type.

Optionally, in another embodiment, in step 103, that the network management server may determine a manner of area-based wireless network fault diagnosis according to the statistical information corresponding to each area of the at least one area includes determining and detecting whether a service is problematic, or determining and detecting connectivity of a network connection in an area, and the like. The detecting whether a service is problematic may include detecting the maximum number of users who access the service, detecting a user association failure ratio of the service, and detecting traffic of a user equipment whose traffic falls within a third threshold rank among user equipment that use the service (TOP-M, where M is a positive integer) or a radio frequency bandwidth utilization ratio of the service, and the like.

For example, referring to step 303 in FIG. 3, when the network management server determines, according to the second statistical information, that a percentage of user equipment whose signal value of wireless signal quality is smaller than the first signal threshold in a first area of the at least one area is higher than a second percentage threshold, it is determined that the manner of the area-based wireless network fault diagnosis is detecting whether a service is problematic.

For another example, referring to FIG. 4, when the network management server determines, according to the first statistical information, that a percentage of user equipment encountering the fault in a first area of the at least one area is higher than a first percentage threshold, it is determined that the manner of the area-based wireless network fault diagnosis is detecting connectivity of a network connection of the first area (step 403). If the network connection fails, the network management server outputs a wireless network fault diagnosis result that indicates a fault of the network connection (step 404). If the network connection is normal, the network management server determines that the manner of the area-based wireless network fault diagnosis is detecting whether a WLAN service is problematic (step 405).

Further, collected data sent by a specific user equipment may be presented below in a tabular form:

TABLE 1

Collected data sent by a specific user equipment

| User name | MAC address | Area | AP | Wireless signal quality information | Fault detection time |
|---|---|---|---|---|---|
| Test 1 | 00-E0-40-88-75-50 | A1 | NY-N3-3F-1 | Signal strength value V1 | time 1 |
| Test 1 | 00-E0-40-88-75-50 | A1 | NY-N3-3F-1 | Delay t1 | time 1 |

As shown in Table 1, the network management server may determine wireless network signal quality (the signal quality may be determined according to a signal strength value or delay of a signal sent by the user equipment) of a user equipment in a specific time segment (the fault detection time "time 1" falls within the time segment), where the user name of the user equipment is Test 1, the MAC address of the user equipment is 00-E0-40-88-75-50, the area in which the user equipment is located is A1, and the AP that covers the user equipment is NY-N3-3F-1.

The network management server may collect statistics on the collected data of the user equipment in the at least one area, for example, may classify a user equipment whose signal strength value is smaller than a first signal strength threshold as a user equipment of low signal quality; classify a user equipment whose signal strength value is greater than a second signal strength threshold as a user equipment of high signal quality; and classify a user equipment whose signal strength value is smaller than or equal to the second signal strength threshold but greater than or equal to the first signal strength threshold as a user equipment of medium signal quality, where the second signal strength threshold is higher than or equal to the first signal strength threshold. For example, statistics are collected for a percentage of user equipment of low signal quality in each area of the at least one area to generate a report of TOP-2 areas of low signal quality. The report may be presented below in a tabular form:

TABLE 2

Report of TOP-2 areas of low signal quality

| Area | Total number of users | Number of users of high signal quality | Number of users of medium signal quality | Number of users of low signal quality | Percentage of users of high signal quality (%) | Percentage of users of medium signal quality (%) | Percentage of users of low signal quality (%) |
|---|---|---|---|---|---|---|---|
| A1 | 100 | 20 | 20 | 60 | 20 | 20 | 60 |
| A2 | 100 | 10 | 20 | 70 | 10 | 20 | 70 |

As shown in Table 2, user equipment of high signal quality in an area A1 account for 20%; and the area of lowest signal quality is A2, in which user equipment of high signal quality account for only 10%. Using the collected statistics, the network management server may determine that a signal coverage (weak signals) problem may occur in the area A2.

For another example, if the percentage of users of low signal quality in an entire area (such as area A2) is 70%, which is higher than a specific percentage threshold (for example, the threshold is 65%), the network management server may detect network connectivity of the area A2 first. For example, the network management server may detect connectivity of an uplink device of a POE switch by means of network quality analyzer (NQA). Because the AP does not support NQA, a problem of delay, packet loss or jitter between the AP and the POE may be checked by means of AP-Ping. If the network management server detects that the network connection in the area A2 is normal, the network management server may further detect whether the WLAN service is problematic, for example, detect whether the maximum number of accessed user equipment is reached or whether a traffic upper limit of the user is reached, or detect the user association failure ratio or the radio frequency bandwidth utilization ratio, and the like.

Therefore, in the embodiment of the present invention, according to generated statistical information corresponding to each area in at least one area, it is determined that a manner of area-based wireless network fault diagnosis is detecting connectivity of a network connection in the area or detect whether a service is problematic. In this way, the wireless network fault diagnosis can be performed in an end-to-end manner during an entire procedure. Using the generated statistical information corresponding to each area of the at least one area (for example, in a statistics period, statistical information about the number of access failures or an access failure ratio that falls within a first threshold rank in each area of the at least one area, statistical information about a signal value that falls within a second threshold rank in each area of the at least one area, first statistical information, second statistical information, or the like), a fault trend on the side of the user equipment can be fully perceived, and network management staff can perceive the user's true feelings of wireless access. When a user equipment environment configuration error (such as a too early version of a wireless network adapter driver) or a service problem or the like occurs, an announcement may be provided. In addition, corresponding measures are taken against wireless network faults, thereby effectively improving satisfaction on user experience.

It should be understood that the sampling data in the foregoing example, the statistical information about the area, the expression form, the data in the table, the fault diagnosis measure taken by the network management server, and the like, are merely exemplary but are not intended to limit the scope of the present invention.

Figure 5:
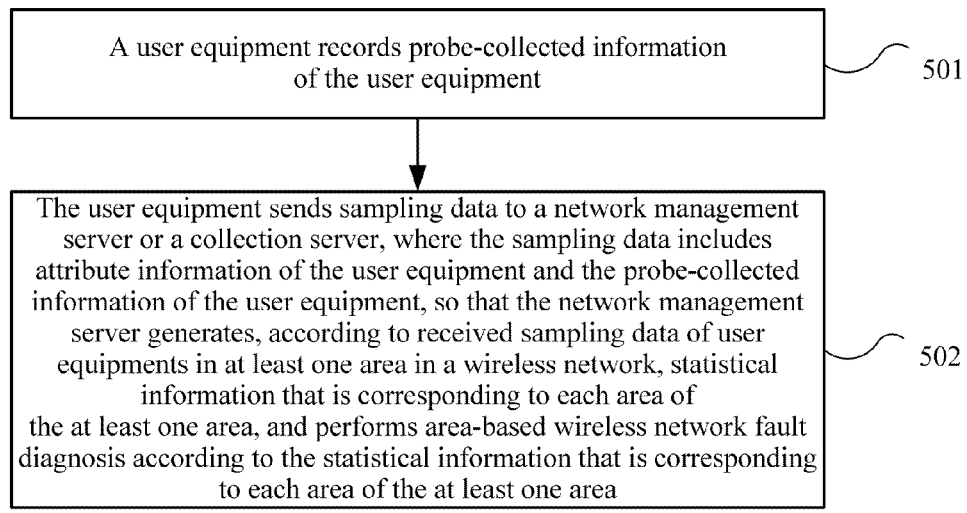
FIG. 5 is a flowchart of a wireless network fault diagnosis method according to an embodiment of the present invention.

FIG. 5 is a flowchart of a wireless network fault diagnosis method according to another embodiment of the present invention. The method in FIG. 5 is implemented by a user equipment, and corresponds to the method shown in FIG. 1. Therefore, description that has been given in the embodiment shown in FIG. 1 is appropriately omitted in this embodiment.

501. The user equipment records probe-collected information of the user equipment.

It should be understood that the probe-collected information, which is recorded by the user equipment, of the user equipment may be measured using a third-party device, and transferred by the third-party device to the user equipment for recording, or may be measured by the user equipment itself. For example, at a specific time point, the user equipment measures current wireless signal stability information such as signal strength. Correspondingly, the probe-collected information, which is recorded by the user equipment, of the user equipment includes a measured signal strength value. Optionally, the time when the signal strength value is measured may further be recorded.

502. The user equipment sends sampling data to a network management server or a collection server, where the sampling data includes attribute information of the user equipment and the probe-collected information of the user equipment, so that the network management server generates, according to received sampling data of user equipment in at least one area in a wireless network, statistical information corresponding to each area in at least one area, and performs area-based wireless network fault diagnosis according to the statistical information corresponding to each area of the at least one area.

Optionally, in an embodiment, the probe-collected information includes but is not limited to a fault type of the user equipment or wireless signal quality information of the user equipment. Optionally, in step 501, the user equipment may further record the time when the probe-collected information of the user equipment is collected (for example, fault detection time of the user equipment). The attribute information, which is included in the sampling data sent in step 502, of the user equipment may include at least one of an identifier of an area in which the user equipment is located, an identifier of the user equipment (for example, a MAC address and a user name of the user equipment), and the like. Optionally, the sampling data may further include fault detection time of the user equipment. It should be understood that the embodiment of the present invention sets no limitation thereto.

Further, the fault type of the user equipment may be an environment configuration fault type of the user equipment or a wireless network access fault type of the user equipment. Optionally, the environment configuration fault type of the user equipment may be that a configuration for an operating system patch, a network adapter driver, an IP obtaining manner, a network adapter power supply connection mode, or the like, is incorrect; and the wireless network access fault type may be that a service such as a DHCP or DNS service is disabled, or that a network connection of a gateway or the DNS or the like fails. The wireless signal quality information of the user equipment may be delay information, packet loss information, wireless signal stability information (for example, signal strength, a jitter, a signal-to-noise ratio or interference strength), or the like. It should be understood that the embodiment of the present invention sets no limitation thereto.

The user equipment in the embodiment of the present invention records the sampling data and feeds back the sampling data to the network management server. In this way, using the collected sampling data of the user equipment in the at least one area in the wireless network, the network management server generates statistical information corresponding to each area of the at least one area to perform wireless network fault diagnosis, so that a fault trend on the side of the user equipment can be fully perceived, and corresponding measures are taken against wireless network faults, thereby effectively improving satisfaction on user experience.

It should be pointed out that the area is a geographic area concept. The same area may be a same floor of a building, a same building, a same campus, a same city, or the like. Certainly, the user equipment under a same AP or AC may also be sorted into the same area. It should be understood that the embodiment of the present invention sets no limitation thereto.

It should further be noted that a device for collecting sampling data may be an independent collection server. In step 502, the user equipment sends the sampling data to the collection server, and the collection server sends the collected sampling data of the user equipment in the at least one area in the wireless network to the network management server. Optionally, a functional unit (collection server) that collects the sampling data may also be integrated into the network management server. Further, the network management server collects the sampling data of the user equipment in the at least one area in the wireless network.

Figure 6:
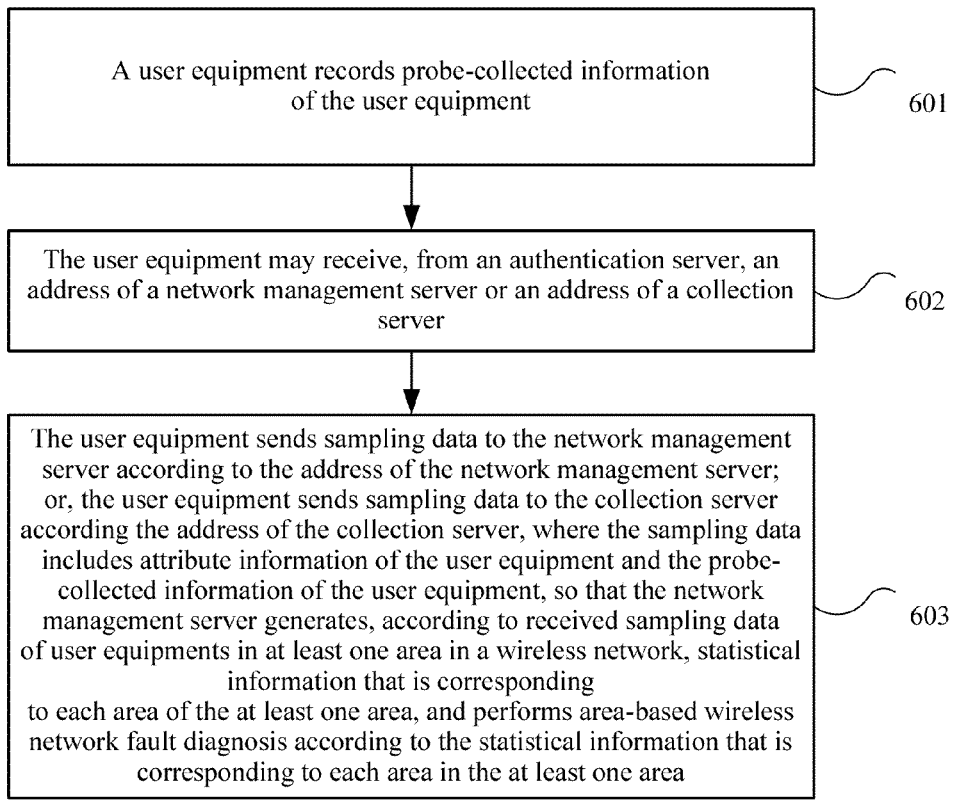
FIG. 6 is a flowchart of a wireless network fault diagnosis method according to another embodiment of the present invention.

Optionally, in another embodiment, an authentication server presets an address of the collection server or an address of the network management server. Referring to FIG. 6, before step 502, step 602 is: The user equipment may receive the address of the network management server or the address of the collection server that is sent by the authentication server. Step 502 may include Step 603: The user equipment sends the sampling data to the network management server according to the address of the network management server; or the user equipment sends the sampling data to the collection server according to the address of the collection server. For description of step 601, reference may be made to step 501, and details are not described herein again. It should be understood that the embodiment of the present invention does not limit an implementation sequence between step 601 and step 602.

Further, the user equipment may receive an EAP packet sent by the authentication server, where the EAP packet carries the address of the network management server or the address of the collection server. Certainly, the address of the network management server or the address of the collection server may be negotiated beforehand. The embodiment of the present invention sets no limitation on how the user equipment determines the address of the network management server.

Figure 7A:
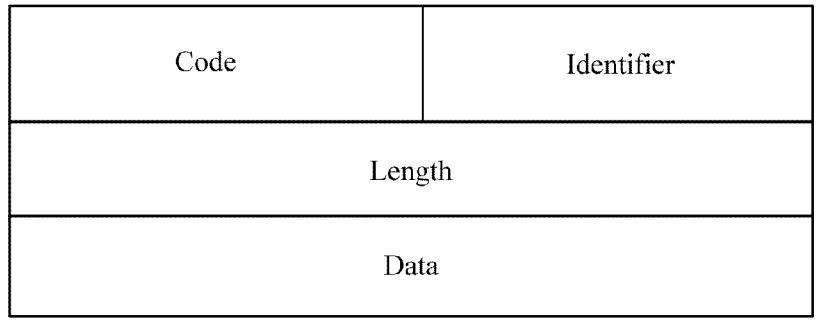
FIG. 7A is a schematic diagram of an EAP packet format according to an embodiment of the present invention.
Figure 7B:
FIG. 7B is a schematic diagram of an extended code type of an EAP packet format according to an embodiment of the present invention.

Further, a standard EAP packet format is shown in FIG. 7A, where a code field indicates the type of an EAP packet, which comes in a total of four types: request, response, success, and failure; a length field indicates a length of the EAP packet (the length covers the code field, an identifier field, the length field, and a data field, and is measured in bytes); the identifier field is used to match a request message to a response message; and the data field is content of the EAP packet, and depends on the code type. A standard packet of a success type or a failure type has no data field. However, in the embodiment of the present invention, the EAP packet may be an EAP packet whose extended code type is success. After authentication succeeds, the authentication (Radius) server may send an EAP packet, that is, the data field of an extended packet of a success type, to the user equipment, which may be exemplarily shown in FIG. 7B. In the EAP packet, a type field indicates an authentication type of the EAP packet, and content of a type data field depends on the type. For example, the type in the data field is: collect: 0x01, and type data: x.x.x.x (the address of the collection server). The user equipment may parse the EAP packet to obtain the address of the collection server, and send the sampling data to the collection server.

Optionally, in another embodiment, in step 502, the user equipment may send the sampling data to the network management server or the collection server in the form of a UDP packet.

For example, the sampling data is packetized by invoking a Windows (WIN) Socket application programming interface (API), and the packetized sampling data is sent to the network management server or the collection server in the form of a UDP packet, which may be expressed as follows:

statistical information corresponding to each area of the at least one area to perform wireless network fault diagnosis, so that a fault trend on the side of the user equipment can be fully perceived, and corresponding measures are taken against wireless network faults, thereby effectively improving satisfaction on user experience.

Figure 8:
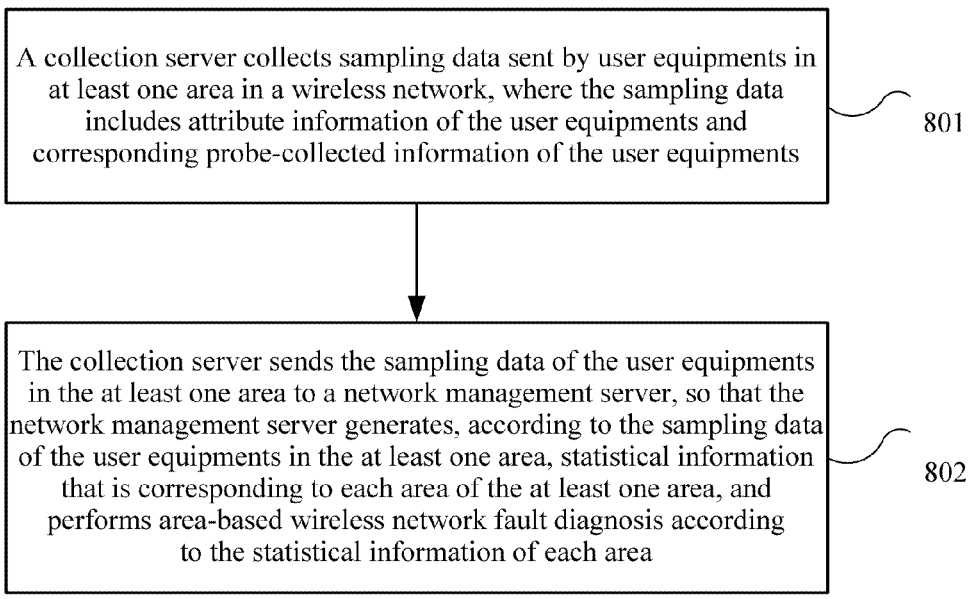
FIG. 8 is a flowchart of a wireless network fault diagnosis method according to an embodiment of the present invention.

FIG. 8 is a flowchart of a wireless network fault diagnosis method according to another embodiment of the present invention. The method in FIG. 8 is implemented by the collection server, and corresponds to the methods shown in FIG. 1 and FIG. 5. Therefore, description that has been given in the embodiments shown in FIG. 1 and FIG. 5 is appropriately omitted in this embodiment.

801. A collection server collects sampling data sent by user equipment in at least one area in a wireless network, where the sampling data includes attribute information of the user equipment and corresponding probe-collected information of the user equipment.

802. The collection server sends the sampling data of the user equipment in the at least one area to a network management server, so that the network management server generates, according to the sampling data of the user equipment in the at least one area, statistical information corresponding to each area of the at least one area, and performs area-based wireless network fault diagnosis according to the statistical information corresponding to each area of the at least one area.

Optionally, in an embodiment, the probe-collected information included in the sampling data includes at least one of a fault type of the user equipment and wireless signal quality information of the user equipment. The attribute information, which is included in the sampling data, of the user equipment may include at least one of an identifier of an area in which the user equipment are located, identifiers of the user equipment (for example, MAC addresses and user names of the user equipment), and the like. Optionally, the sampling data may further include fault detection time of the user equipment. It should be understood that the embodiment of the present invention sets no limitation thereto.

Further, the fault type of the user equipment may be an environment configuration fault type of the user equipment or

```
//packetize sampling data
Char zMsg[ ] =
    "mac:10.137.33.33|lost:0.2%|avg:1.5|singnal:-70|fault:NETCARDDIRVER...";
//define a sockaddr sending address
sockaddr_in addrto;
memset(&addrto,0,sizeof(addrto));
//specify an address type
addrto.sin_family = AF_INET;
//send an IP address
addrto.sin_addr.s_addr = inet_addr("x.x.x.x");
//a port number is 514
addrto.sin_port = htons(514);
//send a packet
if(SOCKET_ERROR!= sendto(sock, szMsg, strlen(szMsg), 0,
    (sockaddr*)&addrto,nlen))
```

It should be understood that the foregoing example is merely exemplary but not intended to limit the embodiment of the present invention.

By means of the foregoing solution, a user equipment can upload sampling data to a network management server or a collection server, that is, the user equipment feeds back a fault type of the user equipment or wireless signal quality information of the user equipment. In this way, using collected sampling data of user equipment in at least one area in a wireless network, the network management server generates a wireless network access fault type of the user equipment. Optionally, the environment configuration fault type of the user equipment may be that a configuration for an operating system patch, a network adapter driver, an IP obtaining manner, a network adapter power supply connection mode, or the like, is incorrect; and the wireless network access fault type may be that a service such as a DHCP or DNS service is disabled, or that a network connection of a gateway or the DNS or the like fails. The wireless signal quality information of the user equipment may be delay information, packet loss information, wireless signal stability information (for example, signal strength, a jitter, a signal-to-noise ratio or interference strength), or the like. It should be understood that the embodiment of the present invention sets no limitation thereto.

In the embodiment of the present invention, a collection server collects sampling data of user equipment in at least one area in a wireless network, where the sampling data includes attribute information of the user equipment and corresponding probe-collected information of the user equipment; and the sampling data is sent to a network management server. In this way, using the sampling data of the user equipment in the at least one area in the wireless network, which is collected by the collection server, the network management server generates statistical information corresponding to each area of the at least one area to perform wireless network fault diagnosis, so that a fault trend on the side of the user equipment can be fully perceived, and corresponding measures are taken against wireless network faults, thereby effectively improving satisfaction on user experience.

It should be pointed out that the area is a geographic area concept. The same area may be a same floor of a building, a same building, a same campus, a same city, or the like. Certainly, the user equipment under a same AP or AC may also be sorted into the same area. It should be understood that the embodiment of the present invention sets no limitation thereto.

Figure 9:
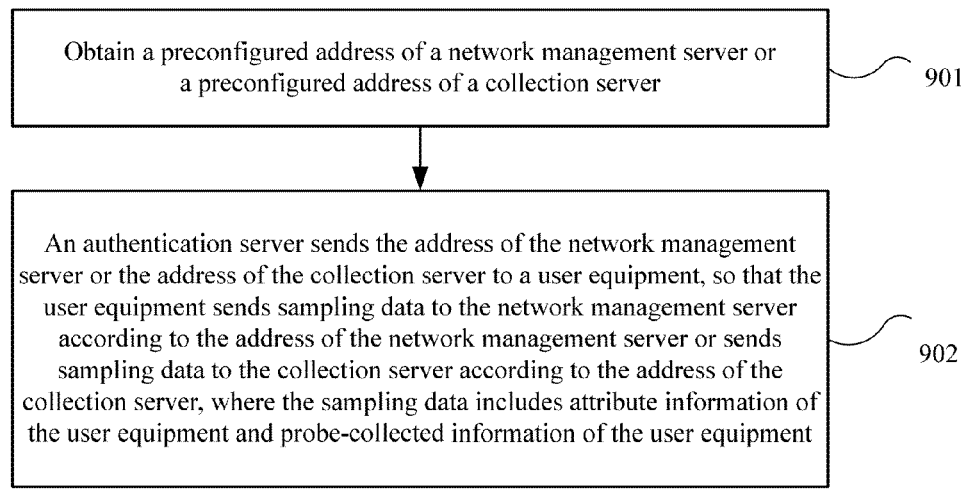
FIG. 9 is a flowchart of a wireless network fault diagnosis method according to an embodiment of the present invention.

FIG. 9 is a flowchart of a wireless network fault diagnosis method according to another embodiment of the present invention. The method in FIG. 9 is implemented by an authentication server, and corresponds to the method shown in FIG. 5. Therefore, description that has been given in the embodiment shown in FIG. 5 is appropriately omitted in this embodiment.

901. Obtain a preconfigured address of a network management server or a preconfigured address of a collection server.

902. Send the address of the network management server or the address of the collection server to a user equipment, so that the user equipment sends sampling data to the network management server according to the address of the network management server or sends sampling data to the collection server according to the address of the collection server, where the sampling data includes attribute information of the user equipment and probe-collected information of the user equipment.

Optionally, the probe-collected information includes but is not limited to a fault type of the user equipment or wireless signal quality information of the user equipment. The attribute information of the user equipment includes but is not limited to an identifier of an area in which the user equipment is located or an identifier of the user equipment.

Further, the fault type of the user equipment may be an environment configuration fault type of the user equipment or a wireless network access fault type of the user equipment. Optionally, the environment configuration fault type of the user equipment may be that a configuration for an operating system patch, a network adapter driver, an IP obtaining manner, a network adapter power supply connection mode, or the like, is incorrect; and the wireless network access fault type may be that a service such as a DHCP or DNS service is disabled, or that a network connection of a gateway or the DNS or the like fails. The wireless signal quality information of the user equipment may be delay information, packet loss information, wireless signal stability information (for example, signal strength, a jitter, a signal-to-noise ratio or interference strength), or the like. It should be understood that the embodiment of the present invention sets no limitation thereto.

In the embodiment of the present invention, an authentication server sends an address of a network management server or an address of a collection server to a user equipment. In this way, the user equipment can send sampling data to the collection server according to the address of the collection server, and the collection server sends collected sampling data of user equipment in at least one area to the network management server; or send the sampling data to the network management server according to the address of the network management server, and the network management server collects the sampling data of the user equipment in the at least one area. Therefore, using the collected sampling data of the user equipment in the at least one area in the wireless network, the network management server generates statistical information corresponding to each area of the at least one area to perform wireless network fault diagnosis, so that a fault trend on the side of the user equipment can be fully perceived, and corresponding measures are taken against wireless network faults, thereby effectively improving satisfaction on user experience.

Optionally, in another embodiment, for description of step 1001, reference may be made to step 901, and details are not described herein again.

Figure 10:
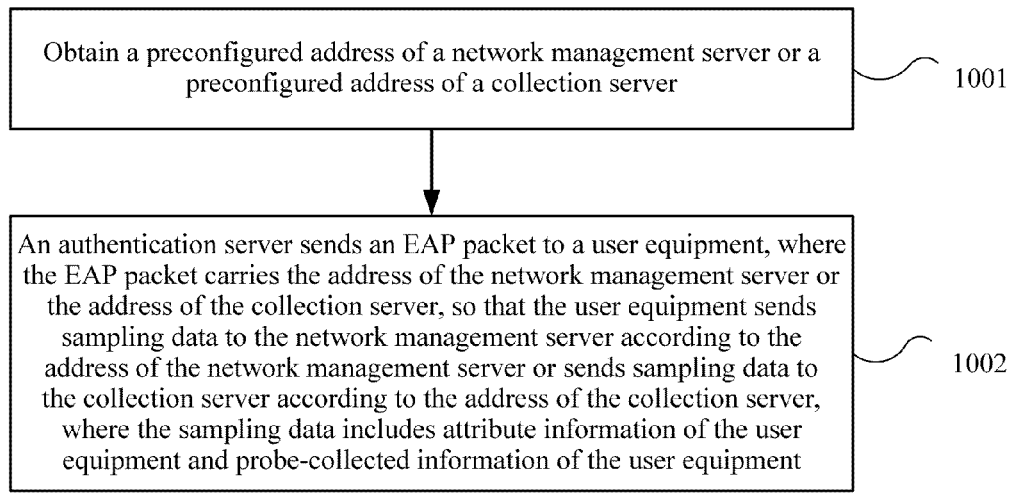
FIG. 10 is a flowchart of a wireless network fault diagnosis method according to another embodiment of the present invention.

As shown in FIG. 10, step 1002: An authentication server sends an EAP packet to a user equipment, where the EAP packet carries an address of a network management server or an address of a collection server.

In the embodiment of the present invention, the EAP packet may be an EAP packet whose extended code type is success. After the user equipment is authenticated successfully, the authentication server may send an EAP packet, that is, a data field of an extended packet of a success type, to the user equipment. In the EAP packet, a type field indicates an authentication type of the EAP packet, and content of a type data field depends on the type. Reference may be made to the embodiment in FIG. 5, and details are not described herein again.

Figure 11:
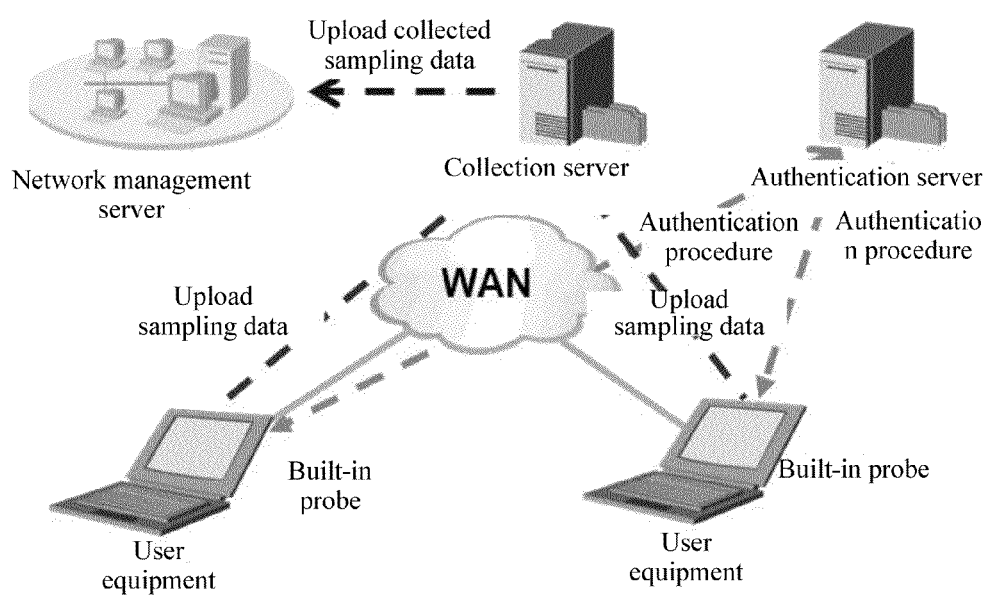
FIG. 11 is a schematic diagram of a wireless network system architecture according to an embodiment of the present invention.

An independent collection server is used as an example of a device for collecting sampling data. Referring to FIG. 11, it should be understood that a functional unit (collection server) for collecting the sampling data may also be integrated into the network management server. The embodiment of the present invention sets no limitation thereto. In the schematic diagram of a wireless network system shown in FIG. 11, the address of the collection server is preconfigured in the authentication server. A probe is embedded into the user equipment to record the probe-collected information of the user equipment. The number of devices (for example, the number of user equipment and the number of authentication servers) is merely exemplary but not intended to limit the scope of the present invention.

Figure 12:
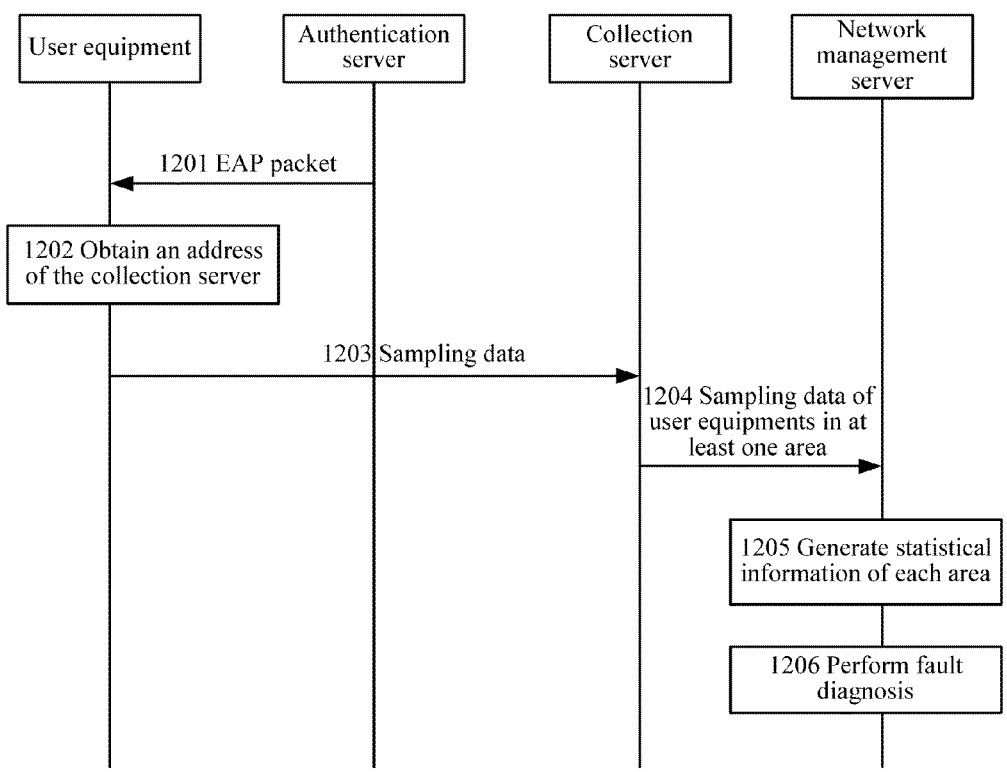
FIG. 12 is a schematic interaction flowchart of a wireless network fault diagnosis method according to an embodiment of the present invention.

The following describes the embodiment of the present invention with reference to a scenario shown in FIG. 11. Refer to FIG. 12.

1201. An authentication server sends an EAP packet to a user equipment, where the EAP packet carries an address of a collection server.

Optionally, in a user equipment authentication procedure, the authentication server sends the address of the collection server to the user equipment. Further, the EAP packet may be an EAP packet whose extended code type is success. After authentication succeeds, the authentication server may send an EAP packet, that is, a data field of an extended packet of a success type, to the user equipment, which may be exemplarily shown in FIG. 7B. In the EAP packet, a type field indicates an authentication type of the EAP packet, and content of a type data field depends on the type. For example, the type in the data field is: collect (collect): 0x01, and type data: x.x.x.x (the address of the collection server).

1202. The user equipment obtains the address of the collection server.

Optionally, the EAP packet received in step 401 may be parsed to obtain the address of the collection server. Sampling data is sent to the collection server. Certainly, the address of the collection server may also be negotiated beforehand. The embodiment of the present invention sets no limitation on how the user equipment determines the address of the collection server.

1203. The user equipment sends the sampling data to the collection server, where the sampling data includes attribute information of the user equipment and corresponding probe-collected information of the user equipment.

Optionally, the probe-collected information included in the sampling data includes but is not limited to a fault type of the user equipment or wireless signal quality information of the user equipment. The attribute information, which is included in the sampling data, of the user equipment includes but is not limited to an identifier of an area in which the user equipment is located (for example, an identifier of an AP that covers the user equipment and/or an identifier of a building in which the user equipment is located), an identifier of the user equipment (for example, a MAC address or a user name of the user equipment), or the like. Optionally, the sampling data may further include fault detection time of the user equipment. It should be understood that the embodiment of the present invention sets no limitation thereto.

Further, the fault type of the user equipment may be an environment configuration fault type of the user equipment or a wireless network access fault type of the user equipment. Optionally, the environment configuration fault type of the user equipment may be that a configuration for an operating system patch, a network adapter driver, an IP obtaining manner, a network adapter power supply connection mode, or the like, is incorrect; and the wireless network access fault type may be that a service such as a DHCP or DNS service is disabled, or that a network connection of a gateway or the DNS or the like fails. The wireless signal quality information of the user equipment may be delay information, packet loss information, wireless signal stability information (for example, signal strength, a jitter, a signal-to-noise ratio or interference strength), or the like. It should be understood that the embodiment of the present invention sets no limitation thereto.

For example:

TABLE 3

Collected data sent by a user equipment

| User name | MAC address | Area | AP | Fault type | Fault detection time |
|---|---|---|---|---|---|
| Test 1 | 00-E0-40-88-75-50 | A1 | NY-N3-3F-1 | Too early version of a network adapter driver | time 2 |
| Test 1 | 00-E0-40-88-75-50 | A1 | NY-N3-3F-1 | Too early version of an operating system patch | time 3 |

1204. The collection server sends collected sampling data of user equipment in at least one area to the network management server.

1205. The network management server generates, according to the collected sampling data of the user equipment in the at least one area, statistical information corresponding to each area of the at least one area.

The statistical information corresponding to each area of the at least one area may be a report of a fault trend of TOP-N1 users of access failure ratios, a report of an access quality trend of TOP-N2 users of low access quality, a report of areas of low signal quality, or statistical information about TOP-N areas of high fault ratios, and the like. It should be understood that the embodiment of the present invention sets no limitation thereto.

Further, the network management server collects, according to the identifier of the area in which the user equipment are located, statistics on sampling data that belongs to a same area and includes the wireless network access fault type of the user equipment from the sampling data of the user equipment in the at least one area, to obtain the number of wireless network access failures or an access failure ratio of the user equipment in a statistics period, where the number of wireless network access failures or the access failure ratio is corresponding to each area of the at least one area; and outputs statistical information (for example, a fault trend report of TOP-N1 users of access failure ratios) of the number of access failures or the access failure ratio that falls within a first threshold rank (TOP-N1, where N1 is a positive integer) in the statistics period, where the number of access failures or the access failure ratio is corresponding to each area of the at least one area. Optionally, statistics are collected for sampling data that belongs to a same area and includes the wireless signal quality information of the user equipment; a signal value (for example, a signal strength value or a signal-to-noise ratio, or a signal value denoted by interference strength or delay or the like) of wireless signal quality of the user equipment in a statistics period is obtained, where the signal value is corresponding to each area of the at least one area; and statistical information (for example, an access quality trend report of TOP-N2 users of low access quality) about the signal value that falls within a second threshold rank (TOP-N2, where N2 is a positive integer) in the statistics period is output, where the signal value is corresponding to each area of the at least one area. Optionally, the network management server may collect, according to the identifier of the area in which the user equipment are located, statistics on sampling data that belongs to a same area and includes the fault type of the user equipment from the sampling data of the user equipment in the at least one area, to obtain first statistical information (such as statistical information about TOP-N areas of high fault ratios) that includes the number of users or a percentage of users who encounter the fault type in each area of the at least one area in a statistics period. Optionally, statistics are collected for the sampling data that belongs to a same area and includes the wireless signal quality information of the user equipment; and second statistical information (such as a report of areas of low signal quality) is obtained, where the second statistical information includes the number of users or a percentage of users whose signal value of wireless signal quality is lower than a first signal threshold in each area of the at least one area in the statistics period (here a larger signal value represents higher signal quality, and the signal value may be denoted by a signal strength value or a signal-to-noise ratio or interference strength or delay or another parameter), and the like.

1206. The network management server performs area-based wireless network fault diagnosis according to the statistical information corresponding to each area of the at least one area.

Further, the network management server may determine a manner of area-based wireless network fault diagnosis according to the statistical information corresponding to each area of the at least one area, where the manner includes determining and detecting whether a service is problematic, or determining and detecting connectivity of a network connection in an area, and the like. The detecting whether a service is problematic may include detecting the maximum number of users who access the service, detecting a user association failure ratio of the service, and detecting traffic of TOP-M users of the service or detecting a radio frequency bandwidth utilization ratio of the service, and the like.

For example, when it is determined according to the second statistical information that a percentage of user equipment whose signal value of wireless signal quality is smaller than the first signal threshold in a first area of the at least one area is higher than a second percentage threshold, it is determined that the manner of the area-based wireless network fault diagnosis is detecting whether a service is problematic.

Optionally, when the network management server determines, according to the first statistical information, that a percentage of user equipment encountering the fault in a first area of the at least one area is higher than a first percentage threshold, it is determined that the manner of the area-based wireless network fault diagnosis is detecting connectivity of a network connection of the first area. If the network connection fails, the network management server outputs a wireless network fault diagnosis result that indicates a fault of the network connection. If the network connection is normal, the network management server determines that the manner of the area-based wireless network fault diagnosis is detecting whether a WLAN service is problematic, and the like.

It should be understood that the foregoing example is merely exemplary, and the embodiment of the present invention does not limit the fault diagnosis manner used by the network management server.

By means of the foregoing solution, using the collected sampling data of the user equipment in the at least one area in the wireless network, the network management server generates statistical information corresponding to each area of the at least one area to perform wireless network fault diagnosis, so that a fault trend on the side of the user equipment can be fully perceived, and corresponding measures are taken against wireless network faults, thereby effectively improving satisfaction on user experience.

Figure 13:
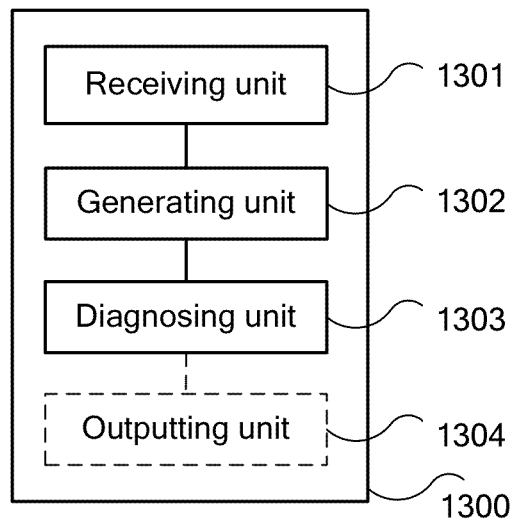
FIG. 13 is a structural block diagram of a network management server according to an embodiment of the present invention.

FIG. 13 is a structural block diagram of a network management server according to an embodiment of the present invention. The network management server 1300 includes a receiving unit 1301, a generating unit 1302, and a diagnosing unit 1303.

The receiving unit 1301 is configured to receive sampling data of user equipment in at least one area in a wireless network, where the sampling data includes attribute information of the user equipment and corresponding probe-collected information of the user equipment.

The generating unit 1302 is configured to generate, according to the sampling data of the user equipment in the at least one area, statistical information corresponding to each area of the at least one area, where the sampling data is received by the receiving unit 1301.

The diagnosing unit 1303 is configured to perform area-based wireless network fault diagnosis according to the statistical information corresponding to each area of the at least one area, where the statistical information is generated by the generating unit 1302.

Optionally, the attribute information, which is received by the receiving unit 1301, of the user equipment may include at least one of an identifier of an area in which the user equipment are located (for example, an identifier of an AP that covers the user equipment and/or an identifier of a building in which the user equipment are located), identifiers of the user equipment (for example, MAC addresses or user names of the user equipment), and the like. The probe-collected information received by the receiving unit 1301 includes at least one of a fault type of the user equipment, wireless signal quality information of the user equipment, and the like. The sampling data may further include fault detection time of the user equipment. It should be understood that the embodiment of the present invention sets no limitation thereto.

Further, the fault type of the user equipment that is received by the receiving unit 1301 may be an environment configuration fault type of the user equipment or a wireless network access fault type of the user equipment. Optionally, the environment configuration fault type of the user equipment may be that a configuration for an operating system patch, a network adapter driver, an IP obtaining manner, a network adapter power supply connection mode, or the like, is incorrect; and the wireless network access fault type may be that a service such as a DHCP or DNS service is disabled, or that a network connection of a gateway or the DNS or the like fails. The wireless signal quality information of the user equipment may be delay information, packet loss information, wireless signal stability information (for example, signal strength, a jitter, a signal-to-noise ratio or interference strength), or the like.

In the embodiment of the present invention, a network management server receives sampling data of user equipment in at least one area in a wireless network, where the sampling data includes attribute information of the user equipment and corresponding probe-collected information of the user equipment; the network management server generates, according to the sampling data, statistical information corresponding to each area of the at least one area; and the network management server performs area-based wireless network fault diagnosis according to the statistical information corresponding to each area of the at least one area. Therefore, using the collected sampling data of the user equipment in the at least one area in the wireless network, the statistical information corresponding to each area of the at least one area is generated to perform wireless network fault diagnosis, and a fault trend on the side of the user equipment can be fully perceived, so that corresponding measures are taken against wireless network faults to effectively improve satisfaction on user experience.

It should be pointed out that the area is a geographic area concept. The same area may be a same floor of a building, a same building, a same campus, a same city, or the like. Certainly, the user equipment under a same AP or AC may also be sorted into the same area. It should be understood that the embodiment of the present invention sets no limitation thereto.

The network management server 1300 can implement operations of the network management server mentioned in the embodiments shown in FIG. 1 to FIG. 12. Therefore, to avoid repetition, the operations are not detailed herein any further.

Optionally, in an embodiment, the fault type of the user equipment that is received by the receiving unit 1301 includes a wireless network access fault type of the user equipment; and the generating unit 1302 is configured to collect, according to the identifier of the area in which the user equipment are located, statistics on sampling data that belongs to a same area and includes the wireless network access fault type of the user equipment from the sampling data that is of the user equipment in the at least one area and is received by the receiving unit 1301, to obtain the number of wireless network access failures or an access failure ratio of the user equipment in a statistics period, where the number of wireless network access failures or the access failure ratio is corresponding to each area of the at least one area; and output statistical information about the number of access failures or the access failure ratio that falls within a first threshold rank in the statistics period, where the number of access failures or the access failure ratio is corresponding to each area of the at least one area.

Optionally, the generating unit 1302 is configured to collect, according to the identifier of the area in which the user equipment are located, statistics on sampling data that belongs to a same area and includes the wireless signal quality information of the user equipment from the sampling data that is of the user equipment in the at least one area and is received by the receiving unit 1301, to obtain a signal value of wireless signal quality of the user equipment in a statistics period, where the signal value is corresponding to each area of the at least one area; and output statistical information about the signal value that falls within a second threshold rank in the statistics period, where the signal value is corresponding to each area of the at least one area.

Optionally, the generating unit 1302 is configured to collect, according to the identifier of the area in which the user equipment are located, statistics on sampling data that belongs to a same area and includes the fault type of the user equipment from the sampling data received by the receiving unit 1301, to obtain first statistical information that includes the number of users or a percentage of users who encounter the fault type in each area of the at least one area in a statistics period.

Optionally, the generating unit 1302 is configured to collect, according to the identifier of the area in which the user equipment are located, statistics on sampling data that belongs to a same area and includes the wireless signal quality information of the user equipment from the sampling data received by the receiving unit 1301, to obtain second statistical information that includes the number of users or a percentage of users whose signal value of wireless signal quality is smaller than a first signal threshold in each area of the at least one area in the statistics period.

Optionally, the diagnosing unit 1303 is configured to, when it is determined according to the first statistical information that a percentage of user equipment encountering the fault type in a first area of the at least one area is higher than a first percentage threshold, determine that a manner of the area-based wireless network fault diagnosis is detecting connectivity of a network connection of the first area. The network management server may further include an outputting unit 1304, and the outputting unit 1304 is configured to, if the diagnosing unit 1303 diagnoses that the network connection of the first area fails, output a wireless network fault diagnosis result that indicates a fault of the network connection. The diagnosing unit 1303 is further configured to, if the diagnosing unit 1303 diagnoses that the network connection of the first area is normal, determine that the manner of the area-based wireless network fault diagnosis is detecting whether a service is problematic.

Optionally, the diagnosing unit 1303 is configured to, when it is determined according to the second statistical information that a percentage of user equipment whose signal value of wireless signal quality is smaller than the first signal threshold in a first area of the at least one area is greater than a second percentage threshold, determine that the manner of the area-based wireless network fault diagnosis is detecting whether a service is problematic.

In determining that the manner of the area-based wireless network fault diagnosis is detecting whether a service is problematic, the diagnosing unit 1303 is configured to determine that the manner of the area-based wireless network fault diagnosis is at least one of detecting the maximum number of users who access the service, detecting a user association failure ratio of the service, and detecting traffic of the user equipment whose traffic falls within a third threshold rank among user equipment that use the service or a radio frequency bandwidth utilization ratio of the service.

Therefore, in the embodiment of the present invention, according to generated statistical information corresponding to each area in at least one area, it is determined that a manner of area-based wireless network fault diagnosis is detecting connectivity of a network connection in the area or detect whether a service is problematic. In this way, the wireless network fault diagnosis can be performed in an end-to-end manner during an entire procedure. Using the generated statistical information corresponding to each area of the at least one area (for example, in a statistics period, statistical information about the number of access failures or an access failure ratio that falls within a first threshold rank in each area of the at least one area, statistical information about a signal value that falls within a second threshold rank in each area of the at least one area, first statistical information, second statistical information, or the like), a fault trend on the side of the user equipment can be fully perceived, and network management staff can perceive the user's true feelings of wireless access. When a user equipment environment configuration error (such as a too early version of a wireless network adapter driver) or a service problem or the like occurs, an announcement may be provided. In addition, corresponding measures are taken against wireless network faults, thereby effectively improving satisfaction on user experience.

Optionally, in another embodiment, the receiving unit 1301 is configured to receive sampling data of the user equipment in the at least one area in the wireless network, where the sampling data is sent by a collection server; or the receiving unit 1301 is configured to collect sampling data sent by the user equipment in the at least one area in the wireless network. That is, a device for collecting sampling data may be an independent collection server, and a functional unit for collecting sampling data may also be integrated into the network management server.

Further, the receiving unit 1301 is configured to receive the sampling data that is sent in the form of a UDP packet by the user equipment in the at least one area in the wireless network.

Figure 14:
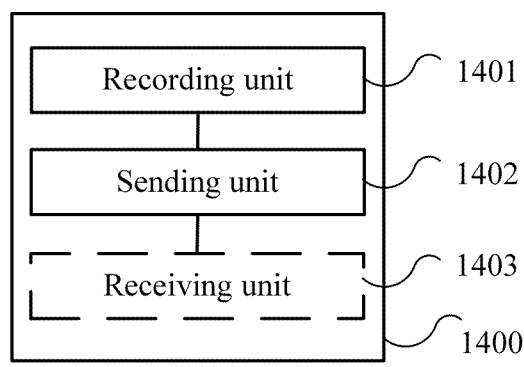
FIG. 14 is a structural block diagram of a user equipment according to an embodiment of the present invention.

FIG. 14 is a structural block diagram of a user equipment according to an embodiment of the present invention. The user equipment 1400 includes a recording unit 1401 and a sending unit 1402.

The recording unit 1401 is configured to record probe-collected information of the user equipment.

The sending unit 1402 is configured to send sampling data to a network management server or a collection server, where the sampling data includes attribute information of the user equipment and the probe-collected information recorded by the recording unit 1401, so that the network management server generates statistical information corresponding to each area in at least one area according to received sampling data of user equipment in at least one area in a wireless network and performs area-based wireless network fault diagnosis according to the statistical information corresponding to each area of the at least one area. In an implementation manner, the attribute information of the user equipment may be locally maintained by the user equipment 1400, and stored in a memory.

Optionally, the probe-collected information, which is recorded by the recording unit 1401, of the user equipment includes but is not limited to a fault type of the user equipment or wireless signal quality information of the user equipment. The attribute information, which is included in the sampling data sent by the sending unit 1402, of the user equipment may include at least one of an identifier of an area in which the user equipment is located, an identifier of the user equipment (for example, a MAC address and a user name of the user equipment), and the like. Optionally, the sampling data may further include fault detection time of the user equipment. It should be understood that the embodiment of the present invention sets no limitation thereto.

Further, the fault type, which is recorded by the recording unit 1401, of the user equipment may be an environment configuration fault type of the user equipment or a wireless network access fault type of the user equipment. Optionally, the environment configuration fault type of the user equipment may be that a configuration for an operating system patch, a network adapter driver, an IP obtaining manner, a network adapter power supply connection mode, or the like, is incorrect; and the wireless network access fault type may be that a service such as a DHCP or DNS service is disabled, or that a network connection of a gateway or the DNS or the like fails. The wireless signal quality information of the user equipment may be delay information, packet loss information, wireless signal stability information (for example, signal strength, a jitter, a signal-to-noise ratio or interference strength), or the like. It should be understood that the embodiment of the present invention sets no limitation thereto.

The user equipment in the embodiment of the present invention records the sampling data and feeds back the sampling data to the network management server. In this way, using the collected sampling data of the user equipment in the at least one area in the wireless network, the network management server generates statistical information corresponding to each area of the at least one area to perform wireless network fault diagnosis, so that a fault trend on the side of the user equipment can be fully perceived, and corresponding measures are taken against wireless network faults, thereby effectively improving satisfaction on user experience.

It should be pointed out that the area is a geographic area concept. The same area may be a same floor of a building, a same building, a same campus, a same city, or the like. Certainly, the user equipment under a same AP or AC may also be sorted into the same area. It should be understood that the embodiment of the present invention sets no limitation thereto.

The user equipment 1400 can implement operations of the user equipment mentioned in the embodiments shown in FIG. 1 to FIG. 12. Therefore, to avoid repetition, the operations are not detailed herein any further.

Optionally, in an embodiment, the user equipment 1400 may further include a receiving unit 1403. The receiving unit 1403 is configured to receive, from an authentication sever, an address of the network management server that is sent by an authentication server or an address of the collection server. The sending unit 1402 is configured to send the sampling data to the network management server according to the address of the network management server that is received by the receiving unit 1403, so that the network management server generates, according to the received sampling data of the user equipment in the at least one area in the wireless network, statistical information corresponding to each area of the at least one area, and performs area-based wireless network fault diagnosis according to the statistical information corresponding to each area of the at least one area; or, send the sampling data to the collection server according to the address of the collection server that is received by the receiving unit 1403, and further, using the collection server, send the sampling data to the network management server, so that the network management server generates, according to the sampling data of the user equipment in the at least one area, statistical information corresponding to each area of the at least one area, and performs area-based wireless network fault diagnosis according to the statistical information corresponding to each area of the at least one area.

In an implementation manner, the receiving unit 1403 is configured to receive an EAP packet sent by the authentication server, where the EAP packet carries the address of the network management server or the address of the collection server. Certainly, the address of the network management server or the address of the collection server may be negotiated beforehand. The embodiment of the present invention sets no limitation on how the user equipment determines the address of the network management server.

Optionally, in an implementation manner, the sending unit 1402 is configured to send the sampling data to the network management server or the collection server in the form of a UDP packet. For details, reference may be made to the embodiment in FIG. 5, and details are not described herein again.

Figure 15:
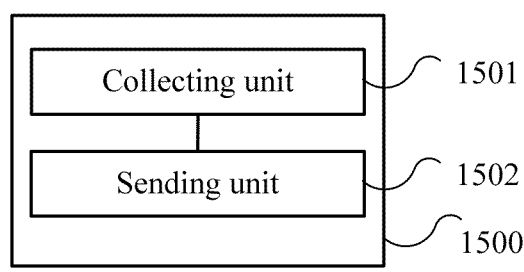
FIG. 15 is a structural block diagram of a collection server according to an embodiment of the present invention.

FIG. 15 is a structural block diagram of a collection server according to an embodiment of the present invention. The collection server 1500 includes a collecting unit 1501 and a sending unit 1502.

The collecting unit 1501 is configured to collect sampling data sent by user equipment in at least one area in a wireless network, where the sampling data collected by the collecting unit 1501 includes attribute information of the user equipment and corresponding probe-collected information of the user equipment.

The sending unit 1502 configured to send the sampling data collected by the collecting unit 1501 to a network management server, so that the network management server generates, according to the sampling data of the user equipment in the at least one area, statistical information corresponding to each area of the at least one area, and performs area-based wireless network fault diagnosis according to the statistical information corresponding to each area of the at least one area.

Optionally, in an embodiment, the probe-collected information included in the sampling data collected by the collecting unit 1501 includes at least one of a fault type of the user equipment and wireless signal quality information of the user equipment. The attribute information, which is included in the sampling data collected by the collecting unit 1501, of the user equipment may include at least one of an identifier of an area in which the user equipment are located, identifiers of the user equipment (for example, MAC addresses and user names of the user equipment), and the like. It should be understood that the embodiment of the present invention sets no limitation thereto.

Further, the fault type of the user equipment that is collected by the collecting unit 1501 may be an environment configuration fault type of the user equipment or a wireless network access fault type of the user equipment. Optionally, the environment configuration fault type of the user equipment may be that a configuration for an operating system patch, a network adapter driver, an IP obtaining manner, a network adapter power supply connection mode, or the like, is incorrect; and the wireless network access fault type may be that a service such as a DHCP or DNS service is disabled, or that a network connection of a gateway or the DNS or the like fails. The wireless signal quality information of the user equipment may be delay information, packet loss information, wireless signal stability information (for example, signal strength, a jitter, a signal-to-noise ratio or interference strength), or the like. It should be understood that the embodiment of the present invention sets no limitation thereto.

In the embodiment of the present invention, a collection server collects sampling data of user equipment in at least one area in a wireless network, where the sampling data includes attribute information of the user equipment and corresponding probe-collected information of the user equipment; and the sampling data is sent to the network management server. In this way, using the sampling data, which is collected by the collection server, of the user equipment in the at least one area in the wireless network, the network management server generates statistical information corresponding to each area of the at least one area to perform wireless network fault diagnosis, so that a fault trend on the side of the user equipment can be fully perceived, and corresponding measures are taken against wireless network faults, thereby effectively improving satisfaction on user experience.

The collection server 1500 can implement operations of the network management server mentioned in the embodiments shown in FIG. 1 to FIG. 12. Therefore, to avoid repetition, the operations are not detailed herein any further.

It should be pointed out that the area is a geographic area concept. The same area may be a same floor of a building, a same building, a same campus, a same city, or the like. Certainly, the user equipment under a same AP or AC may also be sorted into the same area. It should be understood that the embodiment of the present invention sets no limitation thereto.

Figure 16:
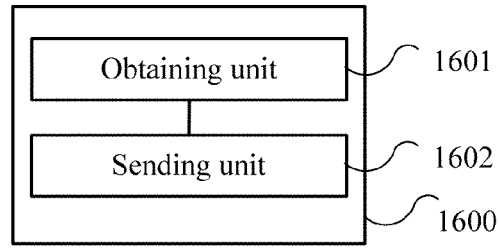
FIG. 16 is a structural block diagram of an authentication server according to an embodiment of the present invention.

FIG. 16 is a structural block diagram of an authentication server according to an embodiment of the present invention. The authentication server 1600 includes an obtaining unit 1601 and a sending unit 1602.

The obtaining unit 1601 is configured to obtain a preconfigured address of a network management server or a preconfigured address of a collection server.

The sending unit 1602 is configured to send the address of the network management server or the address of the collection server to a user equipment, where the address is obtained by the obtaining unit 1601, so that the user equipment sends sampling data to the network management server according to the address of the network management server or sends sampling data to the collection server according to the address of the collection server, where the sampling data includes attribute information of the user equipment and probe-collected information of the user equipment.

Optionally, the probe-collected information includes but is not limited to a fault type of the user equipment or wireless signal quality information of the user equipment. The attribute information of the user equipment includes but is not limited to an identifier of an area in which the user equipment is located or an identifier of the user equipment.

Further, the fault type of the user equipment may be an environment configuration fault type of the user equipment or a wireless network access fault type of the user equipment. Optionally, the environment configuration fault type of the user equipment may be that a configuration for an operating system patch, a network adapter driver, an IP obtaining manner, a network adapter power supply connection mode, or the like, is incorrect; and the wireless network access fault type may be that a service such as a DHCP or DNS service is disabled, or that a network connection of a gateway or the DNS or the like fails. The wireless signal quality information of the user equipment may be delay information, packet loss information, wireless signal stability information (for example, signal strength, a jitter, a signal-to-noise ratio or interference strength), or the like. It should be understood that the embodiment of the present invention sets no limitation thereto.

In the embodiment of the present invention, an authentication server sends an address of a network management server or an address of a collection server to a user equipment. In this way, the user equipment can send sampling data to the collection server according to the address of the collection server, and the collection server sends collected sampling data of user equipment in at least one area to the network management server; or send the sampling data to the network management server according to the address of the network management server, and the network management server collects the sampling data of the user equipment in the at least one area. Therefore, using the collected sampling data of the user equipment in the at least one area in the wireless network, the network management server generates statistical information corresponding to each area of the at least one area to perform wireless network fault diagnosis, so that a fault trend on the side of the user equipment can be fully perceived, and corresponding measures are taken against wireless network faults, thereby effectively improving satisfaction on user experience.

The authentication server 1600 can implement operations of the authentication server mentioned in the embodiments shown in FIG. 1 to FIG. 12. Therefore, to avoid repetition, the operations are not detailed herein any further.

In an implementation manner, the sending unit 1602 is configured to send an EAP packet to the user equipment, where the EAP packet carries the address of the network management server or the address of the collection server, so that the user equipment sends sampling data to the network management server according to the address of the network management server or sends sampling data to the collection server according to the address of the collection server, where the sampling data includes attribute information of the user equipment and probe-collected information of the user equipment. The EAP packet sent by the sending unit 1602 may be an EAP packet whose extended code type is success. After the user equipment is authenticated successfully, the authentication server may send an EAP packet, that is, a data field of an extended packet of a success type, to the user equipment. In the EAP packet, a type field indicates an authentication type of the EAP packet, and content of a type data field depends on the type. Reference may be made to the embodiment in FIG. 5, and details are not described herein again.

Figure 17:
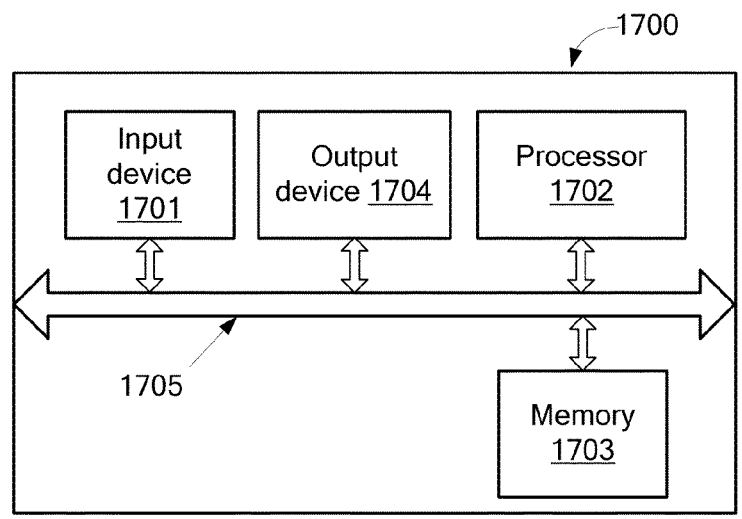
FIG. 17 is a structural block diagram of a network management server according to another embodiment of the present invention.

FIG. 17 is a structural block diagram of a network management server according to another embodiment of the present invention. The network management server 1700 may include an input device 1701, an output device 1704, a processor 1702, and a memory 1703.

The memory 1703 may include a read-only memory and a random access memory, and provide instructions and data for the processor 1702. A part of the memory 1703 may further include a non-volatile random access memory (NVRAM).

The memory 1703 stores the following elements, executable modules or data structures, or subsets thereof, or extended sets thereof: operation instructions, including various operation instructions, which are configured to implement various operations; and an operating system, including various system programs, which is configured to implement various basic services and handle hardware-based tasks.

The processor 1702 controls operations of the network management server 1700, and the processor 1702 may also be referred to as a central processing unit (CPU). The memory 1703 may include a read-only memory and a random access memory, and provide instructions and data for the processor 1702. A part of the memory 1703 may further include a non-volatile random access memory (NVRAM). In a practical application, all components of the user equipment 1700 are coupled together using a bus system 1705, where the bus system 1705 includes not only a data bus, but may also include a power supply bus, a control bus, a state signal bus, and the like. However, for clarity of description, all kinds of buses in the diagram are denoted by the bus system 1705.

The method disclosed in the embodiment of the present invention is applicable to the processor 1702, or may be implemented by the processor 1702. The processor 1702 may be an integrated circuit chip capable of processing signals. In an implementation process, the steps of the foregoing method may be implemented using integrated logical circuits of hardware in the processor 1702 or using instructions of software. The processor 1702 may be a universal processor, a digital signal processor (DSP), an application-specific integrated circuit (ASIC), a field programmable gate array (FPGA) or another programmable logical device, a discrete gate or a transistor logical device, or a discrete hardware assembly. It can implement or execute the methods, steps and logical block diagrams disclosed in the embodiment of the present invention. The universal processor may be a microprocessor or the processor may also be any conventional processor, or the like. The steps of the method disclosed in the embodiment of the present invention may be directly implemented by a hardware decoding processor or implemented by a combination of hardware and software modules in the decoding processor. The software modules may be located in a mature storage medium in the art, such as a random access memory, a flash memory, a read-only memory, a programmable read-only memory or an electrically erasable programmable memory, or a register. The storage medium is located in the memory 1703, and the processor 1702 reads information in the memory 1703, and works together with hardware to implement the steps of the foregoing method.

In the embodiment of the present invention, the processor 1702 performs the following operations by invoking operation instructions (the operation instructions may be stored in an operating system) stored in the memory 1703: using an input device 1701 to receive sampling data of user equipment in at least one area in a wireless network, where the sampling data includes attribute information of the user equipment and corresponding probe-collected information of the user equipment; generating, according to the sampling data of the user equipment in the at least one area, statistical information corresponding to each area of the at least one area, where the sampling data is received by the input device 1701; and performing area-based wireless network fault diagnosis according to the generated statistical information corresponding to each area of the at least one area.

Optionally, the attribute information, which is received by the input device 1701, of the user equipment may include at least one of an identifier of an area in which the user equipment are located (for example, an identifier of an AP that covers the user equipment and/or an identifier of a building in which the user equipment are located) and identifiers of the user equipment (for example, MAC addresses or user names of the user equipment). The probe-collected information received by the input device 1701 includes at least one of a fault type of the user equipment, wireless signal quality information of the user equipment, and the like. The sampling data may further include fault detection time of the user equipment. It should be understood that the embodiment of the present invention sets no limitation thereto.

Further, the fault type of the user equipment that is received by the input device 1701 may be an environment configuration fault type of the user equipment or a wireless network access fault type of the user equipment. Optionally, the environment configuration fault type of the user equipment may be that a configuration for an operating system patch, a network adapter driver, an IP obtaining manner, a network adapter power supply connection mode, or the like, is incorrect; and the wireless network access fault type may be that a service such as a DHCP or DNS service is disabled, or that a network connection of a gateway or the DNS or the like fails. The wireless signal quality information of the user equipment may be delay information, packet loss information, wireless signal stability information (for example, signal strength, a jitter, a signal-to-noise ratio or interference strength), or the like. It should be understood that the embodiment of the present invention sets no limitation thereto.

Optionally, the sampling data, which is sent by a collection server, of the user equipment in the at least one area in the wireless network is received using the input device 1701, or the sampling data sent by the user equipment in the at least one area in the wireless network is collected using the input device 1701. Further, the sampling data that is sent in the form of a UDP packet by the user equipment in the at least one area in the wireless network is received using the input device 1701.

In the embodiment of the present invention, a network management server receives sampling data of user equipment in at least one area in a wireless network, where the sampling data includes attribute information of the user equipment and corresponding probe-collected information of the user equipment; the network management server generates, according to the sampling data, statistical information corresponding to each area of the at least one area; and the network management server performs area-based wireless network fault diagnosis according to the statistical information corresponding to each area of the at least one area, where the probe-collected information includes at least one of a fault type of the user equipment, and wireless signal quality information of the user equipment. Therefore, using the collected sampling data of the user equipment in the at least one area in the wireless network, the statistical information corresponding to each area of the at least one area is generated to perform wireless network fault diagnosis, and a fault trend on the side of the user equipment can be fully perceived, so that corresponding measures are taken against wireless network faults to effectively improve satisfaction on user experience.

The network management server 1700 can implement operations of the network management server mentioned in the embodiments shown in FIG. 1 to FIG. 12. Therefore, to avoid repetition, the operations are not detailed herein any further.

It should be pointed out that the area is a geographic area concept. The same area may be the same floor of a building, the same building, the same campus, or the same city, or the like. Certainly, the user equipment under a same AP or AC may also be sorted into the same area. It should be understood that the embodiment of the present invention sets no limitation thereto.

Optionally, in an embodiment, the sampling data received using the input device 1701 includes an identifier of an area in which the user equipment are located. Optionally, the fault type of the user equipment includes a wireless network access fault type of the user equipment; and the processor 1702 may be configured to collect, according to the identifier of the area in which the user equipment are located, statistics on sampling data that belongs to a same area and includes the wireless network access fault type of the user equipment from the sampling data that is of the user equipment in the at least one area and is received by the input device 1701, to obtain the number of wireless network access failures or an access failure ratio of the user equipment in a statistics period, where the number of wireless network access failures or the access failure ratio is corresponding to each area of the at least one area; and output statistical information about the number of access failures or the access failure ratio that falls within a first threshold rank in the statistics period, where the number of access failures or the access failure ratio is corresponding to each area of the at least one area. Optionally, the processor 1702 may be configured to collect, according to the identifier of the area in which the user equipment are located, statistics on sampling data that belongs to a same area and includes the wireless signal quality information of the user equipment from the sampling data that is of the user equipment in the at least one area and is received using the input device 1701, to obtain a signal value of wireless signal quality of the user equipment in a statistics period, where the signal value is corresponding to each area of the at least one area; and output, using the output device 1704, statistical information about the signal value that falls within a second threshold rank in the statistics period, where the signal value is corresponding to each area of the at least one area. Optionally, the processor 1702 may be configured to collect, according to the identifier of the area in which the user equipment are located, statistics on sampling data that belongs to a same area and includes the wireless signal quality information of the user equipment from the sampling data received using the input device 1701, to obtain first statistical information that includes the number of users or a percentage of users who encounter the fault type in each area of the at least one area in a statistics period. Optionally, the processor 1702 may be configured to collect, according to the identifier of the area in which the user equipment are located, statistics on sampling data that belongs to a same area and includes the wireless signal quality information of the user equipment from the sampling data received using the input device 1701, to obtain second statistical information that includes the number of users or a percentage of users whose signal value of wireless signal quality is smaller than a first signal threshold in each area of the at least one area in the statistics period.

Optionally, the processor 1702 may be configured to, when it is determined according to the first statistical information that a percentage of user equipment encountering the fault type in a first area of the at least one area is higher than a first percentage threshold, determine that a manner of the area-based wireless network fault diagnosis is detecting connectivity of a network connection of the first area. If it is diagnosed that the network connection of the first area fails, a wireless network fault diagnosis result that indicates a fault of the network connection is output using the output device 1704. The processor 1702 may be further configured to, if the network connection of the first area is diagnosed as normal, determine that the manner of the area-based wireless network fault diagnosis is detecting whether a service is problematic.

Optionally, the processor 1702 may be further configured to, when it is determined according to the second statistical information that a percentage of user equipment whose signal value of wireless signal quality is smaller than the first signal threshold in a first area of the at least one area is greater than a second percentage threshold, determine that the manner of the area-based wireless network fault diagnosis is detecting whether a service is problematic.

In determining that the manner of the area-based wireless network fault diagnosis is detecting whether a service is problematic, the processor 1702 may be configured to determine that the manner of the area-based wireless network fault diagnosis is at least one of detecting the maximum number of users who access the service, detecting a user association failure ratio of the service, and detecting traffic of the user equipment whose traffic falls within a third threshold rank among user equipment that use the service or a radio frequency bandwidth utilization ratio of the service.

Therefore, in the embodiment of the present invention, according to generated statistical information corresponding to each area in at least one area, it is determined that a manner of area-based wireless network fault diagnosis is detecting connectivity of a network connection in the area or detect whether a service is problematic. In this way, the wireless network fault diagnosis can be performed in an end-to-end manner during an entire procedure. Using the generated statistical information corresponding to each area of the at least one area (for example, in a statistics period, statistical information about the number of access failures or an access failure ratio that falls within a first threshold rank in each area of the at least one area, statistical information about a signal value that falls within a second threshold rank in each area of the at least one area, first statistical information, second statistical information, or the like), a fault trend on the side of the user equipment can be fully perceived, and network management staff can perceive the user's true feelings of wireless access. When a user equipment environment configuration error (such as a too early version of a wireless network adapter driver) or a service problem or the like occurs, an announcement may be provided. In addition, corresponding measures are taken against wireless network faults, thereby effectively improving satisfaction on user experience.

Figure 18:
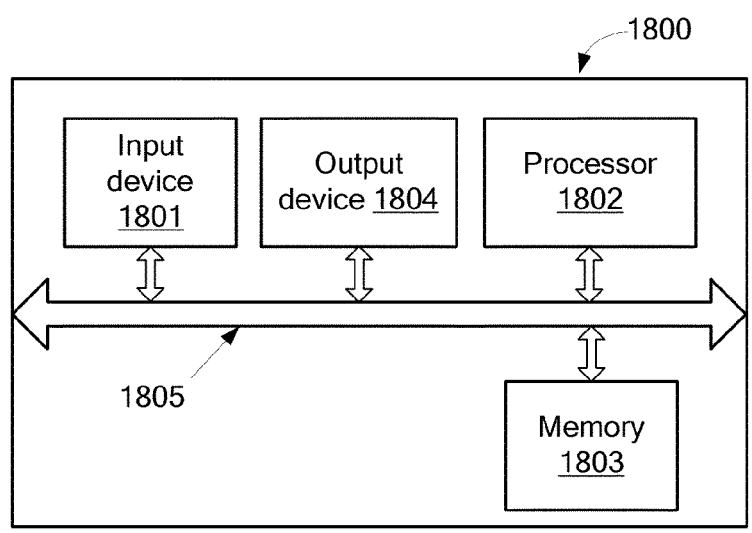
FIG. 18 is a structural block diagram of a user equipment according to another embodiment of the present invention.

FIG. 18 is a structural block diagram of a user equipment 1800 according to another embodiment of the present invention. The user equipment 1800 may include an input device 1801, an output device 1804, a processor 1802, and a memory 1803.

The memory 1803 may include a read-only memory (ROM) and a random access memory (RAM), and provide instructions and data for the processor 1802. A part of the memory 1803 may further include a NVRAM.

The memory 1803 stores the following elements, executable modules or data structures, or subsets thereof, or extended sets thereof: operation instructions, including various operation instructions, which are configured to implement various operations; and an operating system, including various system programs, which is configured to implement various basic services and handle hardware-based tasks.

The processor 1802 controls operations of the user equipment 1800, and the processor 1802 may also be referred to as a CPU. The memory 1803 may include a read-only memory and a random access memory, and provide instructions and data for the processor 1802. A part of the memory 1803 may further include a NVRAM. In a practical application, all components of the user equipment 1800 are coupled together using a bus system 1805, where the bus system 1805 includes not only a data bus, but may also include a power supply bus, a control bus, a state signal bus, and the like. However, for clarity of description, all kinds of buses in the diagram are denoted by the bus system 1805.

The method disclosed in the embodiment of the present invention is applicable to the processor 1802, or may be implemented by the processor 1802. The processor 1802 may be an integrated circuit chip capable of processing signals. In an implementation process, the steps of the method may be implemented using integrated logical circuits of hardware in the processor 1802 or using instructions of software. The processor 1802 may be a universal processor, a DSP, an ASIC, a FPGA or another programmable logical device, a discrete gate or a transistor logical device, or a discrete hardware assembly. It can implement or execute the methods, steps and logical block diagrams disclosed in the embodiment of the present invention. The universal processor may be a microprocessor or the processor may also be any conventional processor, or the like. The steps of the method disclosed in the embodiment of the present invention may be directly implemented by a hardware decoding processor or implemented by a combination of hardware and software modules in the decoding processor. The software modules may be located in a mature storage medium in the art, such as a random access memory, a flash memory, a read-only memory, a programmable read-only memory or an electrically erasable programmable memory, or a register. The storage medium is located in the memory 1803, and the processor 1802 reads information in the memory 1803, and works together with hardware to implement the steps of the foregoing method.

In the embodiment of the present invention, the processor 1802 performs the following operations by invoking operation instructions stored in the memory 1803 (the operation instructions may be stored in an operating system): recording probe-collected information of a user equipment using an input device 1801; and sending sampling data to a network management server or a collection server using an output device 1804, where the sampling data includes attribute information of the user equipment and the probe-collected information of the user equipment that is recorded using the input device 1801, so that the network management server generates, according to received sampling data of user equipment in the at least one area in a wireless network, statistical information corresponding to each area in at least one area, and performs area-based wireless network fault diagnosis according to the statistical information corresponding to each area of the at least one area. In an implementation manner, the attribute information of the user equipment may be locally maintained by the user equipment 1400, and stored in the memory 1803.

Optionally, the probe-collected information, which is recorded using the input device 1801, of the user equipment includes but is not limited to a fault type of the user equipment or wireless signal quality information of the user equipment. The attribute information, which is included in the sampling data, of the user equipment may include at least one of an identifier of an area in which the user equipment is located (for example, an identifier of an AP that covers the user equipment and/or an identifier of a building in which the user equipment is located), and an identifier of the user equipment (for example, a MAC address or a user name of the user equipment). It should be understood that the embodiment of the present invention sets no limitation thereto.

Further, the fault type of the user equipment that is recorded using the input device 1801 may be an environment configuration fault type of the user equipment or a wireless network access fault type of the user equipment. Optionally, the environment configuration fault type of the user equipment may be that a configuration for an operating system patch, a network adapter driver, an IP obtaining manner, a network adapter power supply connection mode, or the like, is incorrect; and the wireless network access fault type may be that a service such as a DHCP or DNS service is disabled, or that a network connection of a gateway or the DNS or the like fails. The wireless signal quality information of the user equipment may be delay information, packet loss information, wireless signal stability information (for example, signal strength, a jitter, a signal-to-noise ratio or interference strength), or the like. It should be understood that the embodiment of the present invention sets no limitation thereto.

The user equipment in the embodiment of the present invention records the sampling data and feeds back the sampling data to the network management server. In this way, using collected sampling data of user equipment in the at least one area in the wireless network, the network management server generates statistical information corresponding to each area of the at least one area to perform wireless network fault diagnosis, so that a fault trend on the side of the user equipment can be fully perceived, and corresponding measures are taken against wireless network faults, thereby effectively improving satisfaction on user experience.

It should be pointed out that the area is a geographic area concept. The same area may be a same floor of a building, a same building, a same campus, a same city, or the like. Certainly, the user equipment under a same AP or AC may also be sorted into the same area. It should be understood that the embodiment of the present invention sets no limitation thereto.

The user equipment 1800 can implement operations of the user equipment mentioned in the embodiments shown in FIG. 1 to FIG. 12. Therefore, to avoid repetition, the operations are not detailed herein any further.

Optionally, in an embodiment, the processor 1802 may be configured to receive, using the input device 1801, an address of the network management server or an address of the collection server that is sent by an authentication server, and send, using the output device 1804, the sampling data to the network management server according to the address of the network management server that is received by the input device 1801 or send the sampling data to the collection server according to the address of the collection server that is received by the input device 1801.

Further, the processor 1802 may be configured to receive, using the input device 1801, an EAP packet sent by the authentication server, where the EAP packet carries the address of the network management server or the address of the collection server. Certainly, the address of the network management server or the address of the collection server may be negotiated beforehand. The embodiment of the present invention sets no limitation on how the user equipment determines the address of the network management server.

Optionally, in another embodiment, the processor 1802 may be configured to send the sampling data to the network management server or the collection server in the form of a UDP packet using the output device 1804. For details, reference may be made to the embodiment in FIG. 5, and details are not described herein again.

Figure 19:
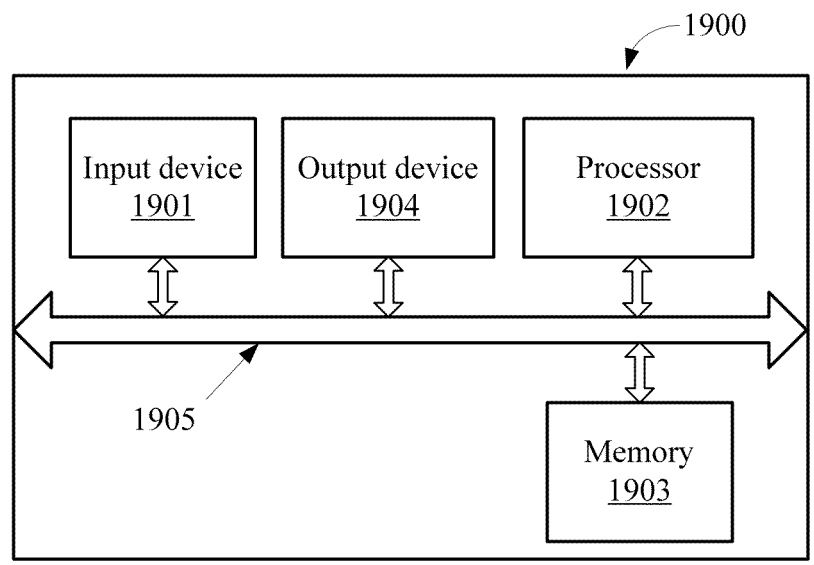
FIG. 19 is a structural block diagram of a collection server according to another embodiment of the present invention.

FIG. 19 is a structural block diagram of a collection server according to another embodiment of the present invention. The collection server 1900 may include an input device 1901, an output device 1904, a processor 1902, and a memory 1903.

The memory 1903 may include a read-only memory and a random access memory, and provide instructions and data for the processor 1902. A part of the memory 1903 may further include a NVRAM.

The memory 1903 stores the following elements, executable modules or data structures, or subsets thereof, or extended sets thereof: operation instructions, including various operation instructions, which are configured to implement various operations; and an operating system, including various system programs, which is configured to implement various basic services and handle hardware-based tasks.

The processor 1902 controls operations of the collection server 1900, and the processor 1902 may also be referred to as a CPU. The memory 1903 may include a read-only memory and a random access memory, and provide instructions and data for the processor 1902. A part of the memory 1903 may further include a NVRAM. In a practical application, all components of the user equipment 1900 are coupled together using a bus system 1905, where the bus system 1905 includes not only a data bus, but may also include a power supply bus, a control bus, a state signal bus, and the like. However, for clarity of description, all kinds of buses in the diagram are denoted by the bus system 1905.

The method disclosed in the embodiment of the present invention is applicable to the processor 1902, or may be implemented by the processor 1902. The processor 1902 may be an integrated circuit chip capable of processing signals. In an implementation process, the steps of the method may be implemented using integrated logical circuits of hardware in the processor 1902 or using instructions of software. The processor 1902 may be a universal processor, a DSP, an ASIC, a FPGA or another programmable logical device, a discrete gate or a transistor logical device, or a discrete hardware assembly. It can implement or execute the methods, steps and logical block diagrams disclosed in the embodiment of the present invention. The universal processor may be a microprocessor or the processor may also be any conventional processor, or the like. The steps of the method disclosed in the embodiment of the present invention may be directly implemented by a hardware decoding processor or implemented by a combination of hardware and software modules in the decoding processor. The software modules may be located in a mature storage medium in the art, such as a random access memory, a flash memory, a read-only memory, a programmable read-only memory or an electrically erasable programmable memory, or a register. The storage medium is located in the memory 1903, and the processor 1902 reads information in the memory 1903, and works together with hardware to implement the steps of the foregoing method.

In the embodiment of the present invention, the processor 1902 performs the following operations by invoking operation instructions (the operation instructions may be stored in an operating system) stored in the memory 1903: using an input device 1901 to collect sampling data sent by user equipment in at least one area in a wireless network, where the collected sampling data includes attribute information of the user equipment and corresponding probe-collected information of the user equipment; using an output device 1904 to send the sampling data collected by the input device 1901 to a network management server, so that the network management server generates, according to the sampling data of the user equipment in the at least one area, statistical information corresponding to each area of the at least one area, and performs area-based wireless network fault diagnosis according to the statistical information corresponding to each area of the at least one area.

Optionally, in an embodiment, the probe-collected information that is included in the sampling data collected using the input device 1901 includes at least one of a fault type of the user equipment and wireless signal quality information of the user equipment. The attribute information, which is included in the sampling data collected using the input device 1901, of the user equipment may include at least one of an identifier of an area in which the user equipment are located (for example, an identifier of an AP that covers the user equipment and/or an identifier of a building in which the user equipment are located) and identifiers of the user equipment (for example, MAC addresses or user names of the user equipment). It should be understood that the embodiment of the present invention sets no limitation thereto.

Further, the fault type, which is collected using the input device 1901, of the user equipment may be an environment configuration fault type of the user equipment or a wireless network access fault type of the user equipment. Optionally, the environment configuration fault type of the user equipment may be that a configuration for an operating system patch, a network adapter driver, an IP obtaining manner, a network adapter power supply connection mode, or the like, is incorrect; and the wireless network access fault type may be that a service such as a DHCP or DNS service is disabled, or that a network connection of a gateway or the DNS or the like fails. The wireless signal quality information of the user equipment may be delay information, packet loss information, wireless signal stability information (for example, signal strength, a jitter, a signal-to-noise ratio or interference strength), or the like. It should be understood that the embodiment of the present invention sets no limitation thereto.

In the embodiment of the present invention, a collection server collects sampling data of user equipment in at least one area in a wireless network, where the sampling data includes attribute information of the user equipment and corresponding probe-collected information of the user equipment; and the sampling data is sent to the network management server. In this way, using the sampling data, which is collected by the collection server, of the user equipment in the at least one area in the wireless network, the network management server generates statistical information corresponding to each area of the at least one area to perform wireless network fault diagnosis, so that a fault trend on the side of the user equipment can be fully perceived, and corresponding measures are taken against wireless network faults, thereby effectively improving satisfaction on user experience.

The collection server 1900 can implement operations of the network management server mentioned in the embodiments shown in FIG. 1 to FIG. 12. Therefore, to avoid repetition, the operations are not detailed herein any further.

It should be pointed out that the area is a geographic area concept. The same area may be a same floor of a building, a same building, a same campus, a same city, or the like. Certainly, the user equipment under a same AP or AC may also be sorted into the same area. It should be understood that the embodiment of the present invention sets no limitation thereto.

Figure 20:
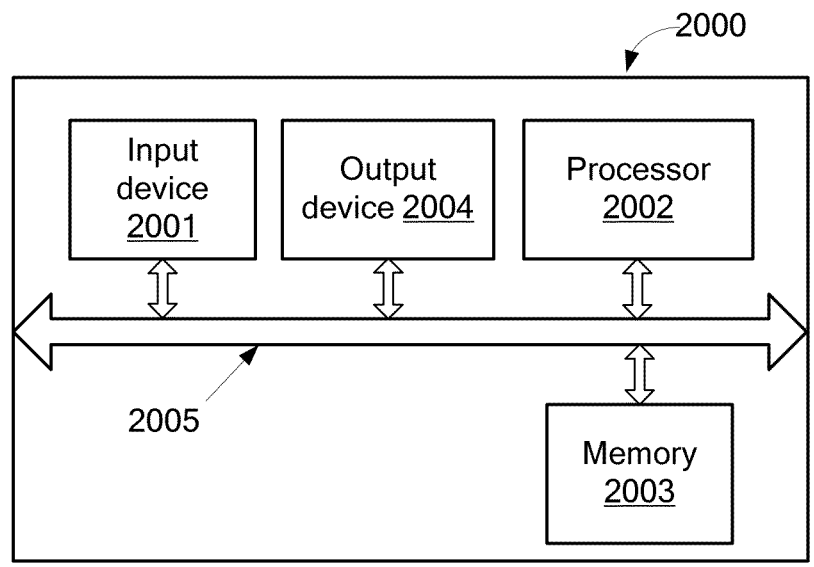
FIG. 20 is a structural block diagram of an authentication server according to another embodiment of the present invention.

FIG. 20 is a structural block diagram of an authentication server according to another embodiment of the present invention. The authentication server 2000 may include an input device 2001, an output device 2004, a processor 2002, and a memory 2003.

The memory 2003 may include a read-only memory and a random access memory, and provide instructions and data for the processor 2002. A part of the memory 2003 may further include a NVRAM.

The memory 2003 stores the following elements, executable modules or data structures, or subsets thereof, or extended sets thereof: operation instructions, including various operation instructions, which are configured to implement various operations; and an operating system, including various system programs, which is configured to implement various basic services and handle hardware-based tasks.

The processor 2002 controls operations of the authentication server 2000, and the processor 2002 may also be referred to as a CPU. The memory 2003 may include a read-only memory and a random access memory, and provide instructions and data for the processor 2002.

A part of the memory 2003 may further include a NVRAM. In a practical application, all components of the user equipment 2000 are coupled together using a bus system 2005, where the bus system 2005 includes not only a data bus, but may also include a power supply bus, a control bus, a state signal bus, and the like. However, for clarity of description, all kinds of buses in the diagram are denoted by the bus system 2005.

The method disclosed in the embodiment of the present invention is applicable to the processor 2002, or may be implemented by the processor 2002. The processor 2002 may be an integrated circuit chip capable of processing signals. In an implementation process, the steps of the method may be implemented using integrated logical circuits of hardware in the processor 2002 or using instructions of software. The processor 2002 may be a universal processor, a DSP, an ASIC, a FPGA or another programmable logical device, a discrete gate or a transistor logical device, or a discrete hardware assembly. It can implement or execute the methods, steps and logical block diagrams disclosed in the embodiment of the present invention. The universal processor may be a microprocessor or the processor may also be any conventional processor, or the like. The steps of the method disclosed in the embodiment of the present invention may be directly implemented by a hardware decoding processor or implemented by a combination of hardware and software modules in the decoding processor. The software modules may be located in a mature storage medium in the art, such as a random access memory, a flash memory, a read-only memory, a programmable read-only memory or an electrically erasable programmable memory, or a register. The storage medium is located in the memory 2003, and the processor 2002 reads information in the memory 2003, and works together with hardware to implement the steps of the foregoing method.

In the embodiment of the present invention, the processor 2002 performs the following operations by invoking operation instructions stored in the memory 2003 (the operation instructions may be stored in an operating system): obtaining a preconfigured address of a network management server or a preconfigured address of a collection server using an input device 2001; and using an output device 2004 to send the address of the network management server or the address of the collection server that is obtained by the input device 2001 to a user equipment, so that the user equipment sends sampling data to the network management server according to the address of the network management server or sends sampling data to the collection server according to the address of the collection server, where the sampling data includes attribute information of the user equipment and probe-collected information of the user equipment.

Optionally, the probe-collected information includes but is not limited to a fault type of the user equipment or wireless signal quality information of the user equipment. The attribute information of the user equipment includes but is not limited to an identifier of an area in which the user equipment is located or an identifier of the user equipment.

Further, the fault type of the user equipment may be an environment configuration fault type of the user equipment or a wireless network access fault type of the user equipment. Optionally, the environment configuration fault type of the user equipment may be that a configuration for an operating system patch, a network adapter driver, an IP obtaining manner, a network adapter power supply connection mode, or the like, is incorrect; and the wireless network access fault type may be that a service such as a DHCP or DNS service is disabled, or that a network connection of a gateway or the DNS or the like fails. The wireless signal quality information of the user equipment may be delay information, packet loss information, wireless signal stability information (for example, signal strength, a jitter, a signal-to-noise ratio or interference strength), or the like. It should be understood that the embodiment of the present invention sets no limitation thereto.

In the embodiment of the present invention, an authentication server sends an address of a network management server or an address of a collection server to a user equipment. In this way, the user equipment can send sampling data to the collection server according to the address of the collection server, and the collection server sends collected sampling data of user equipment in at least one area to the network management server; or send the sampling data to the network management server according to the address of the network management server, and the network management server collects the sampling data of the user equipment in the at least one area. Therefore, using the collected sampling data of the user equipment in the at least one area in the wireless network, the network management server generates statistical information corresponding to each area of the at least one area to perform wireless network fault diagnosis, so that a fault trend on the side of the user equipment can be fully perceived, and corresponding measures are taken against wireless network faults, thereby effectively improving satisfaction on user experience.

The authentication server 2000 can implement operations of the authentication server mentioned in the embodiments shown in FIG. 1 to FIG. 12. Therefore, to avoid repetition, the operations are not detailed herein any further.

Optionally, the processor 2002 may be configured to send, using the output device 2004, an EAP packet to the user equipment, where the EAP packet carries the address of the network management server or the address of the collection server. The EAP packet sent using the output device 2004 may be an EAP packet whose extended code type is success. After the user equipment is authenticated successfully, the authentication server may send an EAP packet, that is, a data field of an extended packet of a success type, to the user equipment. In the EAP packet, a type field indicates an authentication type of the EAP packet, and content of a type data field depends on the type. Reference may be made to the embodiment in FIG. 5, and details are not described herein again.

Figure 21:
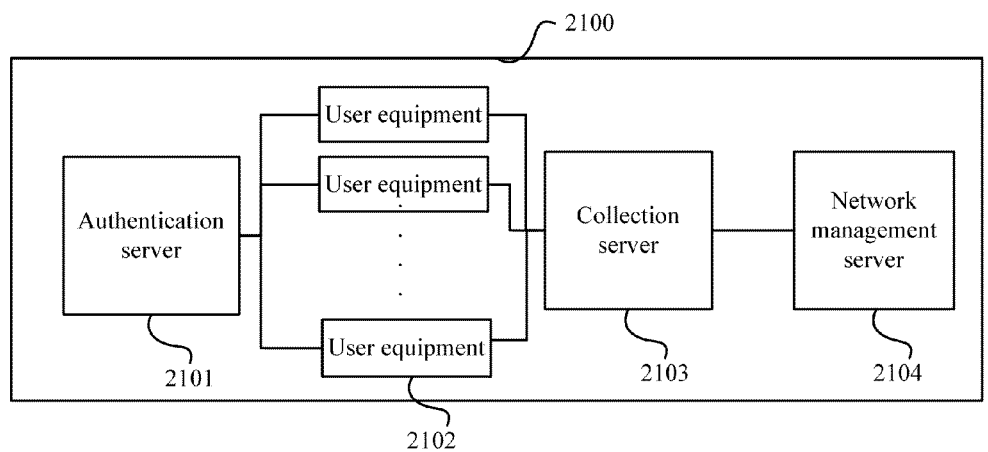
FIG. 21 is a structural block diagram of a communications system according to an embodiment of the present invention.

An embodiment of the present invention further provides a communications system. As shown in FIG. 21, the system 2100 includes an authentication server 2101, a user equipment 2102, a collection server 2103, and a network management server 2104, where the authentication server 2101 is configured to send an address of the collection server 2103 to the user equipment 2102; the user equipment 2102 is configured to record probe-collected information of the user equipment, receive the address of the collection server 2103 that is sent by the authentication server 2101, and send sampling data to the collection server 2103 according to the address of the collection server 2103, where the sampling data includes attribute information of the user equipment and the recorded probe-collected information of the user equipment; the collection server 2103 is configured to receive and collect sampling data sent by user equipment 2102 in at least one area in a wireless network, and send the collected sampling data of the user equipment in the at least one area to the network management server 2104; and the network management server 2104 is configured to receive the sampling data, which is collected by the collection server 2103, of the user equipment in the at least one area, generate, according to the sampling data of the user equipment in the at least one area, statistical information corresponding to each area of the at least one area, and perform area-based wireless network fault diagnosis according to the statistical information corresponding to each area of the at least one area.

It should be noted that in the communications system provided in the embodiment of the present invention, a device for collecting sampling data is implemented by an independent collection server; and, for implementation of functions of the authentication server, the user equipment, the collection server, and the network management server, reference may be made to the foregoing corresponding method or apparatus embodiments, and details are not described herein again.

In the embodiment of the present invention, an authentication server sends an address of a collection server to a user equipment, the user equipment sends sampling data to the collection server according to the address of the collection server, and a collection server collects sampling data of user equipment in at least one area in a wireless network, where the sampling data includes attribute information of the user equipment and corresponding probe-collected information of the user equipment, and sends the sampling data to a network management server. In this way, using the sampling data, which is collected by the collection server, of the user equipment in the at least one area in the wireless network, the network management server generates statistical information corresponding to each area of the at least one area to perform wireless network fault diagnosis, so that a fault trend on the side of the user equipment can be fully perceived, and corresponding measures are taken against wireless network faults, thereby effectively improving satisfaction on user experience.

Figure 22:
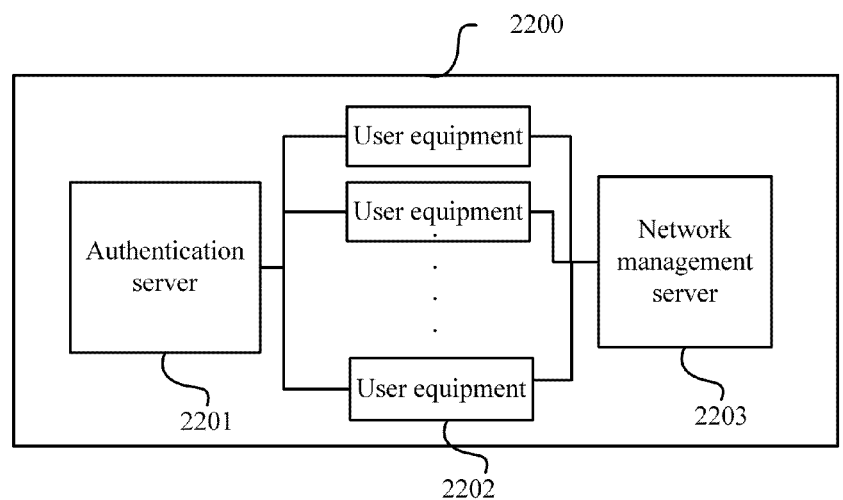
FIG. 22 is a structural block diagram of a communications system according to another embodiment of the present invention.

An embodiment of the present invention further provides another communications system. As shown in FIG. 22, the system 2200 includes an authentication server 2201, a user equipment 2202, and a network management server 2203, where the authentication server 2201 is configured to send an address of the network management server 2203 to the user equipment 2202; the user equipment 2202 is configured to record probe-collected information of the user equipment, and send sampling data to the network management server 2203, where the sampling data includes attribute information of the user equipment and the recorded probe-collected information of the user equipment; and the network management server 2203 is configured to receive and collect sampling data sent by user equipment 2202 in at least one area in a wireless network, generate, according to the sampling data of the user equipment in the at least one area, statistical information corresponding to each area of the at least one area, and perform area-based wireless network fault diagnosis according to the statistical information corresponding to each area of the at least one area.

It should be noted that in the communications system provided in the embodiment of the present invention, a functional unit for collecting sampling data is integrated into the network management server. For implementation of functions of the authentication server, the user equipment, and the network management server, reference may be made to the foregoing corresponding method or apparatus embodiments, and details are not described herein again.

In the embodiment of the present invention, an authentication server sends an address of a network management server to a user equipment, the user equipment sends sampling data to the network management server according to the address of the network management server, and the network management server collects sampling data of user equipment in at least one area in a wireless network, and, using the collected sampling data of the user equipment in the at least one area in the wireless network, generates statistical information corresponding to each area of the at least one area to perform wireless network fault diagnosis, so that a fault trend on the side of the user equipment can be fully perceived, and corresponding measures are taken against wireless network faults, thereby effectively improving satisfaction on user experience.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, a network device, or the like) to perform all or a part of the steps of the methods described in the embodiments of the present invention. The foregoing storage medium includes any medium that can store program code, such as a universal serial bus (USB) flash drive, a removable hard disk, a ROM, a RAM, a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A wireless network fault diagnosis method comprising:
   receiving, by a network management server, sampling data of user equipment in at least one area in a wireless network, wherein the sampling data is sent by a collection server; or
   collecting, by the network management server, sampling data sent by the user equipment in the at least one area in the wireless network, wherein the sampling data comprises attribute information of the user equipment and corresponding probe-collected information of the user equipment, and wherein an address of the network management server or an address of the collection server is carried in an Extensible Authentication Protocol (EAP) packet which is sent from an authentication server to the user equipment, and the address of the network management server or the address of the collection server is used for the user equipment to send the sampling data to the network management server or the collection server;
   generating, by the network management server, according to the sampling data of the user equipment in the at least one area, statistical information corresponding to each area of the at least one area; and
   performing, by the network management server, area-based wireless network fault diagnosis according to the statistical information corresponding to each area of the at least one area.

2. The method according to claim 1, wherein the probe-collected information comprises at least one of a fault type of the user equipment and wireless signal quality information of the user equipment, and wherein the attribute information of the user equipment comprises at least one of an identifier of an area in which the user equipment are located and identifiers of the user equipment.

3. The method according to claim 2, wherein the fault type of the user equipment comprises a wireless network access fault type of the user equipment, and wherein generating, by the network management server according to the sampling data of the user equipment in the at least one area, statistical information corresponding to each area of the at least one area, comprises:
   collecting, by the network management server, according to the identifier of the area in which the user equipment are located, statistics on sampling data that belong to a same area and comprise the wireless network access fault type of the user equipment from the sampling data of the user equipment in the at least one area to obtain the number of wireless network access failures of the user equipment or an access failure ratio of the user equipment in a statistics period, wherein the number of wireless network access failures of the user equipment or the access failure ratio of the user equipment is corresponding to each area of the at least one area; and
   outputting statistical information about the number of wireless network access failures or the access failure ratio that falls within a first threshold rank in the statistics period, wherein the number of wireless network access failures or the access failure ratio is corresponding to each area of the at least one area.

4. The method according to claim 2, wherein generating, by the network management server according to the sampling data of the user equipment in the at least one area, statistical information corresponding to each area of the at least one area, comprises:
   collecting, by the network management server, according to the identifier of the area in which the user equipment are located, statistics on sampling data that belongs to a same area and comprises the wireless signal quality information of the user equipment from the sampling data of the user equipment in the at least one area to obtain a signal value of wireless signal quality of the user equipment in a statistics period, wherein the signal value is corresponding to each area of the at least one area; and
   outputting statistical information about the signal value that falls within a second threshold rank in the statistics period, wherein the signal value is corresponding to each area of the at least one area.

5. The method according to claim 2, wherein generating, by the network management server, statistical information corresponding to each area of the at least one area according to the collected sampling data, comprises:
   collecting, by the network management server, according to the identifier of the area in which the user equipment are located, statistics on sampling data that belongs to a same area and comprises the fault type of the user equipment from the sampling data of the user equipment in the at least one area to obtain first statistical information that comprises the number of users or a percentage of users who encounter the fault type in each area of the at least one area in a statistics period; or
   collecting, by the network management server according to the identifier of the area in which the user equipment are located, statistics on sampling data that belongs to a same area and comprises the wireless signal quality information of the user equipment from the sampling data of the user equipment in the at least one area to obtain second statistical information that comprises the number of users or a percentage of users whose signal value of wireless signal quality is smaller than a first signal threshold in each area of the at least one area in the statistics period.

6. The method according to claim 5, wherein performing, by the network management server, area-based wireless network fault diagnosis according to the statistical information that corresponds to each area of the at least one area, comprises:
   determining that a manner of the area-based wireless network fault diagnosis is detecting connectivity of a network connection of the first area when the network management server determines, according to the first statistical information, that a percentage of user equipment encountering the fault type in a first area of the at least one area is higher than a first percentage threshold;
   outputting, by the network management server, a wireless network fault diagnosis result that indicates a fault of the network connection when the network connection of the first area fails; and
   further determining, by the network management server, that the manner of the area-based wireless network fault diagnosis is detecting whether a service is problematic when the network connection of the first area is normal.

7. The method according to claim 6, wherein determining, by the network management server, that the manner of the area-based wireless network fault diagnosis is detecting whether a service is problematic, comprises determining, by the network management server, that the manner of the area-based wireless network fault diagnosis is at least one of detecting the maximum number of users who access the service, detecting a user association failure ratio of the service, detecting traffic of the user equipment whose traffic falls within a third threshold rank among user equipment that use the service, and detecting a radio frequency bandwidth utilization ratio of the service.

8. The method according to claim 5, wherein performing, by the network management server, area-based wireless network fault diagnosis according to the statistical information corresponding to each area of the at least one area comprises determining that the manner of the area-based wireless network fault diagnosis is detecting whether a service is problematic when the network management server determines, according to the second statistical information, that a percentage of user equipment whose signal value of wireless signal quality is smaller than the first signal threshold in a first area of the at least one area is higher than a second percentage threshold.

9. The method according to claim 8, wherein determining, by the network management server, that the manner of the area-based wireless network fault diagnosis is detecting whether a service is problematic comprises determining, by the network management server, that the manner of the area-based wireless network fault diagnosis is at least one of detecting the maximum number of users who access the service, detecting a user association failure ratio of the service, detecting traffic of the user equipment whose traffic falls within a third threshold rank among user equipment that use the service, and detecting a radio frequency bandwidth utilization ratio of the service.

10. The method according to claim 2, wherein the fault type of the user equipment comprises an environment configuration fault type of the user equipment or the wireless network access fault type of the user equipment, or wherein the wireless signal quality information of the user equipment comprises delay information, packet loss information, or wireless signal stability information.

11. The method according to claim 1, wherein that at least one area comprises multiple areas, wherein the statistical information comprises a statistical report, and wherein the statistical report comprises for each one of the multiple areas an indication of the area, a total number of users in the area, an indication of a number of users with low signal quality, an indication of a number of users with medium signal quality, and an indication of a number of users with high signal quality.

12. The method according to claim 11, wherein the statistical report comprises a table comprising a plurality of columns and a plurality of rows, wherein a first one of the plurality of columns corresponds to the indication of the area, wherein a second one of the plurality of columns corresponds to the total number of users in the area, wherein a third one of the plurality of columns corresponds to the indication of the number of users with the low signal quality, wherein a fourth one of the plurality of columns corresponds to the number of users with the medium signal quality, wherein a fifth one of the plurality of columns corresponds to the number of users with the high signal quality, wherein a sixth one of the plurality of columns corresponds to a percentage of users with the low signal quality, wherein a seventh one of the plurality of columns corresponds to a percentage of users with the medium signal quality, wherein an eighth one of the plurality of columns corresponds to a percentage of users with the high signal quality, and wherein each one of the plurality of rows corresponds to one of the multiple areas.

13. A wireless network fault diagnosis method comprising:
recording, by a user equipment, probe-collected information of the user equipment; and
sending, by the user equipment, sampling data to a network management server or a collection server, wherein the sampling data comprises attribute information of the user equipment and the probe-collected information of the user equipment such that the network management server generates, according to received sampling data of user equipment in at least one area in a wireless network, statistical information corresponding to each area in at least one area, and performs area-based wireless network fault diagnosis according to the statistical information corresponding to each area of the at least one area,
wherein, before the user equipment sends the sampling data to the network management server or the collection server, the method further comprises receiving, by the user equipment, an Extensible Authentication Protocol (EAP) packet sent by the authentication server, wherein an address of the network management server or an address of the collection server is carried in the EAP packet, and
wherein sending, by the user equipment, the sampling data to the network management server or the collection server comprises:
sending, by the user equipment, the sampling data to the network management server according to the address of the network management server; or
sending, by the user equipment, the sampling data to the collection server according to the address of the collection server.

14. The method according to claim 13, wherein the probe-collected information comprises at least one of a fault type of the user equipment, and wireless signal quality information of the user equipment, and wherein the attribute information of the user equipment comprises at least one of an identifier of an area in which the user equipment is located, and an identifier of the user equipment.

15. The method according to claim 14, wherein the fault type of the user equipment comprises an environment configuration fault type of the user equipment or the wireless network access fault type of the user equipment; or the wireless signal quality information of the user equipment comprises delay information, packet loss information, or wireless signal stability information.

16. A network management server, comprising:
a receiving unit configured to receive sampling data of user equipment in at least one area in a wireless network, wherein the sampling data comprises attribute information of the user equipment and corresponding probe-collected information of the user equipment, wherein an address of the network management server or an address of a collection server is carried in an Extensible Authentication Protocol (EAP) packet which is sent from an authentication server to the user equipment, and the address of the network management server or the address of the collection server is used for the user equipment to send the sampling data to the network management server or the collection server;
a generating unit configured to generate, according to the sampling data of the user equipment in the at least one area, statistical information corresponding to each area of the at least one area, where the sampling data is received by the receiving unit; and
a diagnosing unit configured to perform area-based wireless network fault diagnosis according to the statistical information corresponding to each area of the at least one area, wherein the statistical information is generated by the generating unit.

17. The network management server according to claim 16, wherein the probe-collected information received by the receiving unit comprises at least one of a fault type of the user equipment, and wireless signal quality information of the user equipment, and wherein the attribute information of the user equipment that is received by the receiving unit comprises at least one of an identifier of an area in which the user equipment are located, and identifiers of the user equipment.

18. The network management server according to claim 17, wherein the fault type of the user equipment that is received by the receiving unit comprises a wireless network access fault type of the user equipment, and wherein the generating unit is configured to:
   collect, according to the identifier of the area in which the user equipment are located, statistics on sampling data that belongs to a same area and comprises the wireless network access fault type of the user equipment from the sampling data that is of the user equipment in the at least one area and is received by the receiving unit, to obtain the number of wireless network access failures or an access failure ratio of the user equipment in a statistics period, wherein the number of wireless network access failures or the access failure ratio corresponds to each area of the at least one area; and
   output statistical information about the number of access failures or the access failure ratio that falls within a first threshold rank in the statistics period, wherein the number of access failures or the access failure ratio corresponds to each area of the at least one area.

19. The network management server according to claim 17, wherein the generating unit is configured to:
   collect, according to the identifier of the area in which the user equipment are located, statistics on sampling data that belongs to a same area and comprises the wireless signal quality information of the user equipment from the sampling data that is of the user equipment in the at least one area and is received by the receiving unit, to obtain a signal value of wireless signal quality of the user equipment in a statistics period, wherein the signal value corresponds to each area of the at least one area; and
   output statistical information about the signal value that falls within a second threshold rank in the statistics period, wherein the signal value corresponds to each area of the at least one area.

20. The network management server according to claim 17, wherein the generating unit is configured to collect, according to the identifier of the area in which the user equipment are located, statistics on sampling data that belongs to a same area and comprises the fault type of the user equipment from the sampling data received by the receiving unit, to obtain first statistical information that comprises the number of users or a percentage of users who encounter the fault type in each area of the at least one area in a statistics period, or wherein the generating unit is configured to collect, according to the identifier of the area in which the user equipment are located, statistics on sampling data that belongs to a same area and comprises the wireless signal quality information of the user equipment from the sampling data received by the receiving unit, to obtain second statistical information that comprises the number of users or a percentage of users whose signal value of wireless signal quality is smaller than a first signal threshold in each area of the at least one area in the statistics period.

21. The network management server according to claim 20, wherein the diagnosing unit is configured to determine that a manner of the area-based wireless network fault diagnosis is detecting connectivity of a network connection of the first area when it is determined according to the first statistical information that a percentage of user equipment encountering the fault type in a first area of the at least one area is higher than a first percentage threshold, wherein the network management server further comprises an outputting unit, wherein the outputting unit is configured to output a wireless network fault diagnosis result that indicates a fault of the network connection when the diagnosing unit diagnoses that the network connection of the first area fails, and wherein the diagnosing unit is further configured to determine that the manner of the area-based wireless network fault diagnosis is detecting whether a service is problematic when the diagnosing unit diagnoses that the network connection of the first area is normal.

22. The network management server according to claim 21, wherein, in determining that the manner of the area-based wireless network fault diagnosis is detecting whether a service is problematic, the diagnosing unit is configured to determine that the manner of the area-based wireless network fault diagnosis is at least one of detecting the maximum number of users who access the service, detecting a user association failure ratio of the service, and detecting traffic of the user equipment whose traffic falls within a third threshold rank among user equipment that use the service or a radio frequency bandwidth utilization ratio of the service.

23. The network management server according to claim 20, wherein the diagnosing unit is configured to determine that the manner of the area-based wireless network fault diagnosis is detecting whether a service is problematic when it is determined according to the second statistical information that a percentage of user equipment whose signal value of wireless signal quality is smaller than the first signal threshold in a first area of the at least one area is greater than a second percentage threshold.

24. The network management server according to claim 23, wherein, in determining that the manner of the area-based wireless network fault diagnosis is detecting whether a service is problematic, the diagnosing unit is configured to determine that the manner of the area-based wireless network fault diagnosis is at least one of detecting the maximum number of users who access the service, detecting a user association failure ratio of the service, and detecting traffic of the user equipment whose traffic falls within a third threshold rank among user equipment that use the service or a radio frequency bandwidth utilization ratio of the service.

25. The network management server according to claim 17, wherein the fault type of the user equipment that is received by the receiving unit comprises an environment configuration fault type of the user equipment or the wireless network access fault type of the user equipment, or wherein the wireless signal quality information of the user equipment that is received by the receiving unit comprises delay information, packet loss information, or wireless signal stability information.

26. The network management server according to claim 16, wherein the receiving unit is configured to receive sampling data of the user equipment in the at least one area in the wireless network, wherein the sampling data is sent by the collection server, or wherein the receiving unit is configured to collect sampling data sent by the user equipment in the at least one area in the wireless network.

27. A user equipment comprising:
- a recording unit configured to record probe-collected information of the user equipment;
- a sending unit configured to send sampling data to a network management server or a collection server, wherein the sampling data comprises attribute information of the user equipment and the probe-collected information, which is recorded by the recording unit, of the user equipment such that the network management server generates, according to received sampling data of user equipment in at least one area in a wireless network, statistical information corresponding to each area in at least one area, and performs area-based wireless network fault diagnosis according to the statistical information corresponding to each area of the at least one area; and
- a receiving unit configured to receive, from an authentication server, an address of the network management server that is sent by the authentication server or an address of the collection server, wherein the receiving unit is configured to receive an Extensible Authentication Protocol (EAP) packet sent by the authentication server, and wherein the EAP packet carries the address of the network management server or the address of the collection server.

28. The user equipment according to claim 27, wherein the sending unit is configured to:
- send the sampling data to the network management server according to the address of the network management server that is received by the receiving unit such that the network management server generates, according to the received sampling data of the user equipment in the at least one area in the wireless network, statistical information corresponding to each area of the at least one area, and performs area-based wireless network fault diagnosis according to the statistical information corresponding to each area of the at least one area; or
- send the sampling data to the collection server according to the address of the collection server that is received by the receiving unit; and
- further send, using the collection server, the sampling data to the network management server such that the network management server generates, according to the sampling data of the user equipment in the at least one area, statistical information corresponding to each area of the at least one area, and performs area-based wireless network fault diagnosis according to the statistical information corresponding to each area of the at least one area.

29. The user equipment according to claim 27, wherein the probe-collected information sent by the sending unit comprises at least one of a fault type of the user equipment, and wireless signal information of the user equipment, and wherein the attribute information, which is sent by the sending unit, of the user equipment comprises at least one of an identifier of an area in which the user equipment is located, and an identifier of the user equipment.

30. The user equipment according to claim 29, wherein the fault type of the user equipment that is recorded by the recording unit comprises an environment configuration fault type of the user equipment or the wireless network access fault type of the user equipment or wherein the wireless signal quality information of the user equipment that is recorded by the recording unit comprises delay information, packet loss information, or wireless signal stability information.

\* \* \* \* \*